US007638052B2

(12) United States Patent
Mabuchi et al.

(10) Patent No.: US 7,638,052 B2
(45) Date of Patent: Dec. 29, 2009

(54) POLYSULFONE-BASED HOLLOW-FIBER MEMBRANE WITH SELECTIVE PERMEABILITY

(75) Inventors: Kimihiro Mabuchi, Shiga (JP); Noriyuki Tamamura, Osaka (JP); Hidehiko Sakurai, Shiga (JP); Noriaki Kato, Shiga (JP); Hiroshi Shibano, Osaka (JP); Katsuhiko Nose, Osaka (JP)

(73) Assignee: Toyo Boseki Kabushiki Kaisha (JP)

( * ) Notice: Subject to any disclaimer, the term of this patent is extended or adjusted under 35 U.S.C. 154(b) by 524 days.

(21) Appl. No.: 10/559,544

(22) PCT Filed: Jun. 2, 2004

(86) PCT No.: PCT/JP2004/007990

§ 371 (c)(1),
(2), (4) Date: Mar. 29, 2006

(87) PCT Pub. No.: WO2005/051460

PCT Pub. Date: Jun. 9, 2005

(65) Prior Publication Data
US 2006/0205309 A1 Sep. 14, 2006

(30) Foreign Application Priority Data
Nov. 26, 2003 (JP) .............................. 2003-396408

(51) Int. Cl.
*B01D 33/21* (2006.01)
*B01D 39/00* (2006.01)

(52) U.S. Cl. ........................... 210/500.23; 210/500.27; 210/500.42; 210/500.36; 210/500.41

(58) Field of Classification Search ........................ None
See application file for complete search history.

(56) References Cited

U.S. PATENT DOCUMENTS

| 5,340,480 | A | 8/1994 | Kawata et al. | |
|---|---|---|---|---|
| 6,432,309 | B1 | 8/2002 | Fuke et al. | |
| 6,693,266 | B1 | 2/2004 | Yagi | |
| 7,442,302 | B2 * | 10/2008 | Mabuchi et al. | 210/500.23 |
| 2001/0004976 | A1 | 6/2001 | Kozawa et al. | |
| 2006/0191844 | A1 * | 8/2006 | Mahuchi et al. | 210/500.23 |
| 2006/0205309 | A1 * | 9/2006 | Mabuchi et al. | 442/338 |
| 2007/0199891 | A1 * | 8/2007 | Mabuchi et al. | 210/500.23 |
| 2008/0044643 | A1 * | 2/2008 | Yokota et al. | 428/308.4 |

FOREIGN PATENT DOCUMENTS

| CA | 1294745 | 1/1992 |
|---|---|---|
| EP | 0 168 783 | 7/1985 |
| EP | 0 568 045 | 4/1993 |
| EP | 0 568 045 A | 11/1993 |
| EP | 0 997 182 | 5/2000 |
| EP | 0 997 182 A | 5/2000 |
| EP | 1 110 563 | 6/2001 |
| EP | 1 281 432 A | 2/2003 |
| JP | 158-114702 | 7/1983 |
| JP | 5-54373 | 5/1986 |
| JP | 6-75667 | 10/1986 |
| JP | 61-232860 | 10/1986 |
| JP | 5-54373 | 8/1993 |
| JP | 6-165926 | 6/1994 |
| JP | 6-296686 | 10/1994 |
| JP | 07-289863 | 11/1995 |
| JP | 10-243999 | 9/1998 |
| JP | 11-309355 | 9/1999 |
| JP | 11-309355 | 11/1999 |
| JP | 2000-140589 | 5/2000 |
| JP | 2000-157852 | 6/2000 |
| JP | 2000-254222 | 9/2000 |
| JP | 2000-340356 | 12/2000 |
| JP | 3150717 | 1/2001 |
| JP | 2001-38170 | 2/2001 |
| JP | 3193262 | 5/2001 |
| JP | 2001-170171 | 6/2001 |
| JP | 2001-190934 | 7/2001 |
| JP | 2003-175320 | 6/2003 |
| WO | WO 98/52683 | 11/1998 |

\* cited by examiner

*Primary Examiner*—Jill Gray
(74) *Attorney, Agent, or Firm*—Fish & Richardson P.C.

(57) ABSTRACT

The present invention provides a polysulfone type hollow fiber membrane which is reliable in safety and stability of performance and is easily incorporated into a module, and thus can be suitably used in a highly water permeable blood purifier for use in a therapy of chronic renal failure.

The present invention relates to a polysulfone type selectively permeable hollow fiber membrane comprising a polysulfone type resin and a hydrophilic polymer as main components, and characterized in that
(A) the content of the hydrophilic polymer in the uppermost layer of a surface of the polysulfone type hollow fiber membrane on the blood-contacting side is at least 1.1 times larger than the content of the hydrophilic polymer in the proximate layer of the surface on the blood-contacting side, and
(B) the content of the hydrophilic polymer in the uppermost layer of the other surface of the polysulfone type hollow fiber membrane, i.e., the reverse side of the surface on the blood-contacting side, is at least 1.1 times larger than the content of the hydrophilic polymer in the uppermost layer of the surface on the blood-contacting side.

9 Claims, No Drawings

POLYSULFONE-BASED HOLLOW-FIBER MEMBRANE WITH SELECTIVE PERMEABILITY

The present patent application is filed claiming the priority based on the Japanese Patent Application No. 2003-396408, and a whole of the contents of this application should be incorporated herein by reference.

TECHNICAL FIELD

The present invention relates to polysulfone type selectively permeable hollow fiber membranes which are reliable in safety and stability of performance and are easily incoporated into a module and which are particularly suitable for use in blood purifiers. The present invention also pertains to the use of the polysulfone type selectively permeable hollow fiber membranes as blood purifiers, and a process for manufacturing the hollow fiber membranes.

BACKGROUND OF THE INVENTION

In the hemocatharsis for therapy of renal failure, etc., modules such as hemodialyzers, hemofilters and hemodiafilters, which comprise dialysis membrans or ultrafilter membranes as separators are widely used in order to remove urinal toxic substances and waste products in blood. Dialysis membranes and ultrafilter membranes as separators are made up of natural materials such as cellulose or the derivatives thereof (e.g., cellulose diacetate, cellulose triacetate, etc.) or synthetic polymers such as polyslufone, polymethyl methacrylate, polyacrylonitrile, etc. The importance of modules comprising the hollow fiber membranes as separators is very high in the field of dialyzers, in view of the advantages such as the reduction of the amount of extracorporeal circulated blood, high efficiency of removing undesired substances in blood, and high productivity of manufacturing modules.

Highly water permeable polysulfone type resins have attracted public attentions, because such resins are most suitable for the advanced dialysis technology, among the above-listed membrane materials. However, semipermeable membranes made up of a polysulfone resin alone are poor in affinity with blood, inducing airlock phenomena, since the polysulfone type resin is hydrophobic. Therefore, such semipermeable membranes as they are can not be directly used for treating blood.

To solve this problem, there is proposed a method for imparting hydrophilicity to a membrane by blending a polysulfone type resin with a hydrophilic polymer: for example, a polyhydric alcohol such as polyethylene glycol or the like is added to a polysulfone type resin (cf. JP-A-61-232860 and JP-A-58-114702); or otherwise, polyvinyl pyrrolidone is added to a polysulfone type resin (cf. JP-B-5-54373 and JP-B-6-75667).

These methods are effective to solve the foregoing problem. However, finding of the optimum conditions for the hydrophilicity-imparting technique by blending a hydrophilic polymer is very important, because the concentration of the hydrophilic polymer in the inner surface of a hollow fiber membrane on the blood-contacting side and the concentration of the hydrophilic polymer in the outer surface thereof give significant influence on the capacities of the hollow fiber membrane. For example, the compatibility of a hollow fiber membrane with blood can be ensured by increasing the concentration of a hydrophilic polymer in the inner surface of the membrane, while too high a concentration of the hydrophilic polymer in the inner surface of the membrane increases the amount of the hydrophilic polymer eluted into blood. Undesirably, the accumulation of the eluted hydrophilic polymer induces side effects or complications over a long period of dialysis therapy.

On the other hand, too high a concentration of the hydrophilic polymer in the outer surface of the membrane induces a danger of the invasion of highly hydrophilic endotoxin in a dialyzate into the blood side. As a result, side effects such as fever, etc. are induced, or the hydrophilic polymer in the outer surfaces of the hollow fiber membranes permits the sticking of such membranes to one another while the membranes are being dried, which results in a new problem that the incorporation of such membranes into a module becomes hard.

On the contrary, a lower concentration of the hydrophilic polymer in the outer surface of the hollow fiber membrane is preferable, since the invasion of endotoxin into the blood side can be suppressed. However, the hydrophilicity of the outer surface of the hollow fiber membrane becomes lower, which causes a problem in that the outer surface of the hollow fiber membrane becomes poor in compatibility with physiological saline for use in wetting the membrane, when a bundle of dried hollow fiber membranes is wetted and incorporated into a module. As a result, undesirably, the priming of the membranes (purging the membranes of an air when wetting the same) may become lower in efficiency.

There is disclosed a method for solving these problems (cf. JP-A-6-165926): that is, the concentration of a hydrophilic polymer in the dense layer of the inner surface of a hollow fiber membrane is adjusted within a specified range, and the mass ratio of the hydrophilic polymer in the dense layer of the inner surface of the membrane is at least 1.1 times larger than the mass ratio of the hydrophilic polymer in the outer surface of the membrane. In particular, this method is based on a technical idea to increase the mass ratio of the hydrophilic polymer in the dense layer of the inner surface of the membrane to thereby improve the compatibility thereof with blood, and to decrease the mass ratio of the hydrophilic polymer in the outer surface of the membrane to thereby suppress the sticking of the hollow fiber membranes which would occur when drying the membranes. This technique also solves another problem: i.e., the invasion of endotoxin in a dialyzate into the blood side is inhibited. However, there still remains unsolved the problem that the priming of the membrane tends to lower because of too low a mass ratio of the hydrophilic polymer in the outer surface of the membrane. It is therefore needed to solve this problem.

There is disclosed another method of solving the problem of the invasion of endotoxin in a dialyzate into the blood side (cf. JP-A-2001-38170). In this method, the contents of hydrophilic polymers in the proximate layers of the inner surface and the outer surface, and the intermediate layer of a hollow fiber membrane having an uniform membrane structure, determined by infrared-absorbing analysis method, are specified so as to suppress the invasion of endotoxin into the blood side. However, also, this method can not solve the problem of lower priming of the membrane, as well as the former method. In addition, there is a further problem in that the larger size pores of the outer surface of the hollow fiber membrane lower the pressure resistance of the membrane. Therefore, such a membrane has a danger of bursting when used for hemodiafiltration or the like in which the pressure of a fluid is higher than that in the conventional therapies.

There are further disclosed methods for improving the compatibility of membranes with blood and for reducing the amount of hydrophilic polymers eluted into blood, by specifying the contents of the hydrophilic polymers in the inner surfaces of hollow fiber membranes (cf. JP-A-6-296686, JP-A-11-309355 and JP-A-2000-157852).

However, any of the above patent literature does not teach the ratio of the hydrophilic polymer present in the outer surface of the hollow fiber membrane, i.e., the reverse side of the blood-contacting side of the hollow fiber membrane, and thus, any of the inventions of the above publications is not able to improve all the problems attributed to the ratio of the hydrophilic polymer present in the outer surface of the hollow fiber membrane.

There is disclosed a method of solving the problem of the invasion of endotoxin into the blood side, out of the foregoing problems (cf. JP-A-2000-254222). This method is devised by taking advantage of the properties of endotoxin which has a hydrophobic moiety in the molecule and which is apt to be adsorbed onto a hydrophobic material. Specifically, in this method, the ratio of a hydrophilic polymer to a hydrophobic polymer in the outer surface of a hollow fiber membrane is adjusted to 5 to 25%. Surely, this method is effective to suppress the invasion of endotoxin into the side of blood. However, it is needed to remove the hydrophilic polymer in the outer surface of the membrane by washing, so as to impart this feature to the membrane. Accordingly, long treating time is required for this washing, which is disadvantageous in cost. For example, in an Example of the invention of the above patent publication, a hollow fiber membrane is washed by showering with hot water of 60° C. for one hour and washed with hot water of 110° C. for one hour.

This method of decreasing the amount of the hydrophilic polymer in the outer surface of the membrane is effective to inhibit the invasion of endotoxin into the side of blood. However, the hydrophilicity of the outer surface of the membrane becomes lower, which causes the following disadvantage: when a bundle of hollow fiber membranes dried after incorporated into a module is again wetted and incorporated into a module, the hollow fiber membranes become poor in compatibility with physiological saline for wetting the membranes. Undesirably, this method may induce poor priming, i.e., insufficient purging the membranes of an air during a membrane-wetting step. For example, there are disclosed methods of improving this problem, in which a hydrophilic compound such as glyceline or the like is blended (cf. JP-A-2001-190934 and Japanese Patent No. 3193262). These methods, however, have problems in that the hydrophilic compound behaves as a foreign matter during dialysis and also tends to deteriorate by light or the like, which gives an adverse influence on the storage stability of a module, and also in that the hydrophilic compound hinders an adhesive from bonding for fixing a bundle of hollow fiber membranes in a module when the membranes are incorporated into the module.

There are disclosed methods of avoiding the sticking of hollow fiber membranes, i.e., another problem out of the foregoing problems: in any of these methods, the rate of pore area of the outer surface of a membrane is adjusted to 25% or more (cf. JP-A-2001-38170 and JP-A-7-289863). While these methods are surely effective to avoid the sticking of the hollow fiber membranes, the strength of the membranes becomes lower due to the higher rate of pore area, which may lead to the leakage of blood or the like.

Further, a method by specifying the rate of pore area and the pore area of the outer surface of a membrane is disclosed (cf. JP-A-2000-140589)

DISCLOSURE OF THE INVENTION

An object of the present invention is to provide polysulfone type selectively permeable hollow fiber membranes which are reliable in safety and performance stability and are incorporated into a module with ease and which are especially suitable for use in a blood purifier.

As a result of the present inventors' intensive researches for solving the foregoing problems, the present invention is accomplished by providing the following hollow fiber mebrane. That is, the present invention relates to a polysulfone type hollow fiber membrane comprising a polysulfone type resin and a hydrophilic polymer as main components, and characterized in that (A) the content of the hydrophilic polymer in the uppermost layer of a surface of the polysulfone type hollow fiber membrane on the blood-contacting side is at least 1.1 times larger than the content of the hydrophilic polymer in the proximate layer of the same surface of the membrane on the blood-contacting side; and that (B) the content of the hydrophilic polymer in the uppermost layer of the other surface of the polysulfone type hollow fiber membrane, i.e., the reverse side of the surface on the blood-contacting side, is at least 1.1 times larger than the content of the hydrophilic polymer in the uppermost layer of the surface of the membrane on the blood-contacting side.

In one aspect of the present invention, the content of the hydrophilic polymer in the uppermost layer of the surface of the membrane on the blood-contacting side is, in general, preferably 5 to 60 mass %, more preferably 10 to 50 mass %, still more preferably 20 to 40 mass %. The content of the hydrophilic polymer in the proximate layer adjacent to the uppermost layer in the surface of the membrane is generally about 2 to about 37 mass %, optimally about 5 to about 20 mass %. Further, the content of the hydrophilic polymer in the outer surface of the hollow fiber membrane is about 25 to about 50 mass % which is enough to control the content of the hydrophilic polymer in the uppermost layer of the other surface of the membrane, i.e., the reverse side of the surface on the blood-contacting side, to be at least 1.1 times larger than the content of the hydrophilic polymer in the uppermost layer of the surface of the membrane on the blood-contacting side. The contents of the hydrophilic polymer in the respective layers as above are so selected as to adjust the hydrophilic polymer eluted from the hollow fiber membrane to be 10 ppm or less.

Advantageously, the polysulfone type hollow fiber membrane of the present invention is reliable in safety, performance stability and ease of incorporating into a module, and is suitably used in a highly water permeable hollow fiber membrane type blood purifier for hemodialysis for use in therapy of chronic renal failure.

BEST MODES FOR CARRYING OUT THE INVENTION

Hereinafter, the present invention will be explained in more detail.

The hollow fiber membrane to be used in the present invention comprises a polysulfone type resin and a hydrophilic polymer. The polysulfone type resin referred to in the present invention is the generic term of resins having sulfone bonds.

Preferable examples of the polysulfone type resin include, but not limited to, polysulfone resins and polyethersulfone resins both of which comprise repeating units represented by the formula [I] or [II] and which are commercially available with ease.

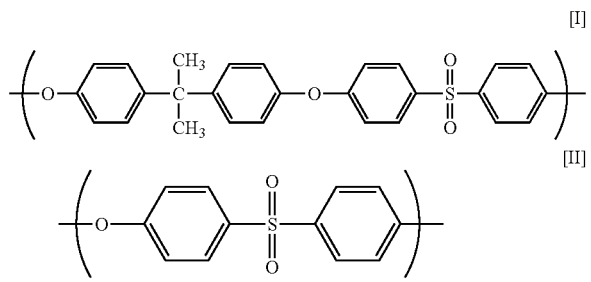

Examples of the hydrophilic polymer referred to in the present invention include materials such as polyethylene glycol, polyvinyl alcohol, polyvinyl pyrrolidone, carboxymethyl cellulose, polypropylene glycol, glycerin, starches, and derivatives thereof. In preferred embodiments of the present invention, polyvinyl pyrrolidone having a weight average molecular weight of 10,000 to 1,500,000 is used in view of safety and cost-effectiveness. In concrete, preferably used are polyvinyl pyrrolidone having a molecular weight of 9,000 (K17), polyvinyl pyrrolidone having a molecular weight of 45,000 (K30), polyvinyl pyrrolidone having a molecular weight of 450,000 (K60), polyvinyl pyrrolidone having a molecular weight of 900,000 (K80) and polyvinyl pyrrolidone having a molecular weight of 1,200,000 (K90) which are commercially available from BASF. Each of the above hydrophilic polymers may be used alone or in combination with one or more of the same resins having different molecular weights, or with one or more of different resins, according to an intended use, or in order to obtain intended capacities or structure.

In the present invention, (A) the content of the hydrophilic polymer in the uppermost layer of a surface of the polysulfone type hollow fiber membrane on the blood-contacting side is at least 1.1 times larger than the content of the hydrophilic polymer in the proximate layer of the surface of the membrane on the blood-contacting side, as mentioned above. Preferably, the content of the hydrophilic polymer in the proximate layer, adjacent to the uppermost layer, of the surface of the membrane is about 2 to about 37 mass %, in order to control the content of the hydrophilic polymer in the uppermost layer to be larger than the content of the hydrophilic polymer in the proximate layer and to optimally control the content of the hydrophilic polymer in the uppermost layer to 20 to 40 mass %. Practically, the proper content of the hydrophilic polymer in the proximate layer of the surface of the membrane is about 5 to about 20 mass % because of this reason. In detail, the multiplying factor of the difference in content is allowed up to maximum 10 or so. When the multiplying factor exceeds this limit, the diffusion and transfer of the hydrophilic polymer may reversely proceed from the uppermost layer to the proximate layer in the surface of the membrane, and the manufacturing of a hollow fiber membrane having a structure allowing such a multiplying factor is difficult. A proper content of the hydrophilic polymer in the uppermost layer of the surface of the membrane on the blood-contacting side can be calculated simply by multiplying the value of the proper content of the hydrophilic polymer in the proximate layer in the surface of the membrane, namely, 5 to 20 mass %, by the value of a multiplying factor of about 1.1 to about 10. By doing so, the optimum value of 20 to 40 mass % is obtained for the content of the hydrophilic polymer in the above uppermost layer. Preferably, the hydrophilic polymer is contained in the uppermost layer in an amount which is usually about 1.1 to about 5 times larger, and as the case may be, optimally about 1.2 to about 3 times larger than the content of the hydrophilic polymer in the proximate layer. Practically, the multiplying factor can be optionally selected in consideration of the capacities of the hollow fiber membrane. For example, when the content of the hydrophilic polymer in the proximate layer of the surface of the membrane is 5 mass % as the lower limit, the content of the hydrophilic polymer in the uppermost layer in the surface of the membrane may be appropriately 20 to 40 mass % which is equivalent to a value 4 to 8 times larger than the content of the hydrophilic polymer in the above proximate layer.

In the present invention, (B) the content of the hydrophilic polymer in the uppermost layer of the other surface of the polysulfone type hollow fiber membrane, i.e., the reverse side of the surface on the blood-contacting side, is at least 1.1 times larger than the content of the hydrophilic polymer in the uppermost layer of the surface of the membrane on the blood-contacting side, as mentioned above. In this regard, the content of the hydrophilic polymer in the outer surface of the hollow fiber membrane is preferably 25 to 50 mass %. When the content of the hydrophilic polymer in the outer surface of the membrane is too small, the amount of protein in blood adsorbed to the support layer of the hollow fiber membrane tends to increase, and undesirably, the compatibility of the membrane with blood and the permeability of the membrane tend to lower. On the contrary, when the content of the hydrophilic polymer in the outer surface of the membrane is too large, there may be higher possibility of the invasion of endotoxin in a dialyzate into the blood side, which may induce side effects such as fever, etc. in a patient, or which may cause a disadvantage that the membranes are hardly incorporated into a module because of the sticking of such hollow fiber membranes due to the hydrophilic polymer in the surfaces of the membranes, when the membranes are dried.

In the present invention, the ratio of the hydrophilic polymer to the polysulfone type resin in the membrane is not particularly limited, and it may be optionally selected, in so far as sufficient hydrophilicity and high moisture content can be imparted to the hollow fiber membrane. Preferably, the mass ratio of the hydrophilic polymer is 1 to 20 mass % relative to 80 to 99 mass % of the polysulfone type resin. More preferably, the mass ratio of the hydrophilic polymer is 3 to 15 mass % relative to 85 to 97 mass % of the polysulfone type resin. When the mass ratio of the hydrophilic polymer is less than 1 mass %, the hydrophilicity-imparting effect may be poor. On the other hand, when the mass ratio of the hydrophilic polymer exceeds 20 mass %, the hydrophilicity-imparting effect is saturated, and the amount of the hydrophilic polymer eluted from the membrane increases and may exceed 10 ppm, as will be described later.

The foregoing preferred embodiments of the present invention will be described in more detail based on the technical features. That is, in a preferred embodiment of the present invention, a polysulfone type selectively permeable hollow fiber membrane which contains a hydrophilic polymer and which simultaneously satisfies the following features can be obtained:

(1) the amount of the hydrophilic polymer eluted from the hollow fiber membrane is 10 ppm or less;

(2) the content of the hydrophilic polymer in the uppermost layer of a surface of the polysulfone type hollow fiber membrane on the blood-contacting side is 20 to 40 mass %;
(3) the content of the hydrophilic polymer in the proximate layer of the surface of the polysulfone type hollow fiber membrane on the blood-contacting side is 5 to 20 mass %; and
(4) the content of the hydrophilic polymer in the uppermost layer of the other surface of the polysulfone type hollow fiber membrane, i.e., the reverse side of the surface on the blood-contacting side, is 25 to 50 mass %, and is at least 1.1 times larger than the content of the hydrophilic polymer in the uppermost layer of the inner surface of the membrane.

In the present invention, the amount of the hydrophilic polymer eluted from the hollow fiber membrane is preferably 10 ppm or less (feature 1). When this amount exceeds 10 ppm, there is a danger of inducing side effects or complications due to the eluted hydrophilic polymer over a long period of dialysis therapy. To obtain this feature, for example, the ratios of the hydrophilic polymer to the hydrophobic polymer in the respective layers are controlled within the foregoing ranges, or otherwise, the conditions for manufacturing the hollow fiber membrane are optimized.

In the present invention, as mentioned above, the content of the hydrophilic polymer in the uppermost layer of the surface of the polysulfone type hollow fiber membrane on the blood-contacting side is preferably 20 to 40 mass % (feature 2). As long as the contents of the hydrophilic polymer and the differences in contents are controlled as described above, the content of the hydrophilic polymer in the uppermost layer of the surface of the polysulfone type hollow fiber membrane on the blood-contacting side can be optionally selected within a wide range of 5 to 60 mass %, for example, 10 to 50 mass %. In order to advantageously attain the effect of the present invention, preferably, the uppermost layer of the inner surface of the hollow fiber membrane comprises 60 to 80 mass % of the polysulfone type resin and 20 to 40 mass % of the hydrophilic polymer as main components. When the content of the hydrophilic polymer is less than 20 mass %, the hydrophilicity of the surface of the hollow fiber membrane on the blood-contacting side becomes lower, which leads to poor compatibility of the membrane with blood so that the blood tends to coagulates on the surface of the hollow fiber membrane. The coagulated thrombus clogs the hollow fiber membrane and degrades the separating capacity of the hollow fiber membrane or increases the amount of the blood left to remain therein after used for hemodialysis. The content of the hydrophilic polymer in the uppermost layer of the inner surface of the hollow fiber membrane is preferably 21 mass % or more, more preferably 22 mass % or more, still more preferably 23 mass % or more. On the other hand, when this content exceeds 40 mass %, the amount of the hydrophilic polymer eluted into the blood increases, and such eluted hydrophilic polymer has a danger of inducing side effects or complication over a long period of hemodialysis therapy. The content of the hydrophilic polymer in the uppermost layer of the inner surface of the hollow fiber membrane is preferably 39 mass % or less, more preferably 38 mass % or less, still more preferably 37 mass % or less.

In the present invention, the content of the hydrophilic polymer in the proximate layer of the surface of the polysulfone type hollow fiber membrane on the blood-contacting side is preferably 5 to 20 mass %, as mentioned above (feature 3). The proximate layer of the surface of the polysulfone type hollow fiber membrane on the blood-contacting side comprises 60 to 99 mass % of the polysulfone type resin and 1 to 40 mass % of the hydrophilic polymer, as main components, which may be optionally selected within the above ranges, respectively. The content of the hydrophilic polymer is preferably 5 to 20 mass %, and in general, more preferably 7 to 18 mass %. The content of the hydrophilic polymer in the uppermost layer in the surface of the polysulfone type hollow fiber membrane on the blood-contacting side is preferably large from the viewpoint of compatibility with blood, as mentioned above. However, there is an antinomy in that the increase of the content of the hydrophilic polymer leads to the increase of the amount of the hydrophilic polymer eluted into the blood. Therefore, the content of the hydrophilic polymer is about 20 to about 40 mass %, which is selected in consideration of the appropriate range thereof.

The content of the hydrophilic polymer in the proximate layer of the inner surface of the hollow fiber membrane may be selected within a relatively wide range of 1 to 40 mass %. However, there is a disadvantage when the content of the hydrophilic polymer in the proximate layer is larger than the content of the hydrophilic polymer in the uppermost layer (for example, when the content of the hydrophilic polymer in the uppermost layer is 30 mass %, and that in the proximate layer, 35 mass %): that is, the diffusion and transfer of the hydrophilic polymer from the proximate layer to the uppermost layer of the inner surface of the membrane is activated, with the result that, undesirably, the content of the hydrophilic polymer in the uppermost layer becomes larger than the predetermined value. To sum up, in consideration of a mechanism which allows the hydrophilic polymer to be supplied to the uppermost layer by the amount of the hydrophilic polymer consumed in the uppermost layer, through the diffusion and transfer of the hydrophilic polymer, the content of the hydrophilic polymer in the proximate layer of the surface of the membrane is relatively smaller than that in the uppermost layer, and is preferably, for example, 19 mass % or less, more preferably 18 mass % or less. When the content of the hydrophilic polymer in the proximate layer of the inner surface of the hollow fiber membrane is too small, it is impossible to supply the hydrophilic polymer from the proximate layer to the uppermost layer, which may lead to a danger of lowering the stability of the solute-removing capacity or the blood compatibility of the hollow fiber membrane. The optimum content of the hydrophilic polymer in the proximate layer of the inner surface of the hollow fiber membrane is, therefore, more preferably 6 mass % or more, still more preferably 7 mass % or more. In general, the content of the hydrophilic polymer in the proximate layer of the surface of the hollow fiber membrane is slightly larger than the average content of the hydrophilic polymer in the hollow fiber membrane of the present invention which comprises 80 to 99 mass % of the polysulfone type polymer and 1 to 20 mass % of the hydrophilic polymer as the main components.

This feature 3 is one of the factors which make it possible to overcome the foregoing antinomy and to optimize the contents of the hydrophilic polymer in the respective layers so as to eliminate the antinomy, at a higher level than any of the conventional techniques has done. The feature 3 is also one of the novel features of the present invention. In other words, the content of the hydrophilic polymer in the uppermost layer of the hollow fiber membrane, which dominantly affects the blood compatibility of the membrane, is set at the lowest level which allows the exhibition of the blood compatibility. However, there arises another problem in that, although this content of the hydrophilic polymer in the uppermost layer can permit the exhibition of the initial blood compatibility, the hydrophilic polymer in the uppermost layer is eluted into blood bit by bit during a long time of hemodialysis, which gradually lowers the blood compatibility in the course of the hemodialysis. The persistency of the blood compatibility of the polysulfone type hollow fiber membrane is improved by specifying the content of the hydrophilic polymer in the proximate layer of the surface of the hollow fiber membrane on the blood-contacting side. By specifying the content of the hydrophilic polymer in the proximate layer of the surface of the hollow fiber membrane, there can be solved the foregoing problems, i.e., the decrease of the content of the hydrophilic polymer in the uppermost layer due to the elution of the hydrophilic polymer of the uppermost layer into blood in association with the proceeding of hemodialysis, and the aged deterioration of the blood compatibility of the membrane attributed to the above decrease of the content of the hydrophilic polymer. This method is based on the technical idea that the transfer of the hydrophilic polymer in the proximate layer of the surface of the hollow fiber membrane, to the uppermost layer thereof can compensate for the decrease of the content of the hydrophilic polymer in the uppermost layer. Accordingly, less than 5 mass % of the content of the hydrophilic polymer in the proximate layer of the surface of the hollow fiber membrane on the blood-contacting side may be possibly insufficient to suppress the deterioration of the consistency of the blood compatibility of the hollow fiber membrane. On the other hand, when the content of the hydrophilic polymer in the proximate layer of the surface of the hollow fiber membrane on the blood-contacting side exceeds 20 mass %, the amount of the hydrophilic polymer eluted into blood tends to increase, which may possibly induce side effects or complications over a long period of hemodialysis therapy. Hitherto, there has been no elucidation of the blood compatibility and the aged stability of the selective permeation of the hollow fiber membrane which are determined by the proper contents of the hydrophilic polymer in the uppermost layer and the proximate layer of the surface of the hollow fiber membrane and the structure thereof. It is to be noted that these matters have been elucidated exactly by the present inventors' novel findings.

In the present invention, the content of the hydrophilic polymer in the uppermost layer of the other surface of the polysulfone type hollow fiber membrane, i.e., the reverse side of the surface on the blood-contacting side, is 25 to 50 mass %, and is preferably at least 1.1 times larger than the content of the hydrophilic polymer in the uppermost layer of the inner surface of the membrane (feature 4), as mentioned above. Too small a content of the hydrophilic polymer in the outer surface of the hollow fiber membrane may possibly lower the blood compatibility and permeation capacity of the hollow fiber membrane, since the amount of protein in blood, adsorbed onto the support layer of the hollow fiber membrane, tends to increase. In case of dried hollow fiber membranes, the priming capacity of the membranes may become poor. The outer surface of the hollow fiber membrane may comprise 90 to 40 mass % of the polysulfone type resin and 10 to 60 mass % of the hydrophilic polymer as the main components. Practically, the content of the hydrophilic polymer in the outer surface of the hollow fiber membrane is more preferably 27 mass % or more, still more preferably 29 mass % or more. Too large a content of the hydrophilic polymer in the outer surface of the membrane, on the contrary, may induce higher possibility of invasion of endotoxin in the dialyzate into the blood side. As a result, side effects such as fever, etc. may be induced; or the hollow fiber membranes tend to stick to one another because of the hydrophilic polymer present on the surfaces of the membranes when the membranes are dried, and this may make it hard to incorporate such membranes into a module. The content of the hydrophilic polymer in the outer surface of the hollow fiber membrane is more preferably 43 mass % or less, still more preferably 40 mass % or less.

As one aspect of the feature 4, the content of the hydrophilic polymer in the uppermost layer of the outer surface of the hollow fiber membrane is preferably at least 1.1 times larger than the content of the hydrophilic polymer in the uppermost layer of the inner surface thereof. The content of the hydrophilic polymer gives some influence on the shrinkage percentage of the hollow fiber membrane formed. With the increase of the content of the hydrophilic polymer, the shrinkage percentage of the resultant hollow fiber membrane tends to increase. For example, when the content of the hydrophilic polymer in the uppermost layer of the inner surface of the membrane is larger than the content of the hydrophilic polymer in the uppermost layer of the outer surface of the membrane, the difference in shrinkage percentage between the inner surface and the outer surface of the membrane may cause microwrinkles on the inner surface of the hollow fiber membrane or break the hollow fiber membrane. The wrinkles formed on the inner surface of the hollow fiber membrane facilitates the accumulation of the protein in blood on the surface of the membrane, when the blood is allowed to flow into the hollow fiber membranes for hemodialysis. This may induce a problem that the permeation capacity of the membrane degrades with time. For this reason, it is preferable to increase the content of the hydrophilic polymer in the outer surface of the hollow fiber membrane so as to be larger than that in the inner surface thereof.

The hollow fiber membrane of the present invention further has a dense layer in the inner surface, and has a structure in which the sizes of pores are gradually increased toward the outer surface of the membrane. Since the void ratio of the outer surface of the membrane is higher than that of the inner surface thereof, the shrinkage percentage of the outer surface of the membrane becomes larger. In consideration of this influence, the content of the hydrophilic polymer in the uppermost layer of the outer surface of the membrane is preferably at least 1.1 times, more preferably at least 1.2 times, still more preferably at least 1.3 times larger than that in the uppermost layer of the inner surface of the membrane.

For the reasons as described above, the better, the larger the content of the hydrophilic polymer in the uppermost layer of the outer surface of the hollow fiber membrane. However, there may be some problems, when the content of the hydrophilic polymer in the uppermost layer of the outer surface of the hollow fiber membrane is 2.0 or more times larger than that in the uppermost layer of the inner surface thereof: that is, the content of the hydrophilic polymer relative to the content of the polysulfone type polymer becomes too large, which may lead to the insufficient strength of the hollow fiber membrane, the sticking of the hollow fiber membranes to one another, the back flow of endotoxin during hemodialysis and the elution of the hydrophilic polymer. The content of the hydrophilic polymer in the uppermost layer of the outer surface of the hollow fiber membrane is more preferably at most 1.9 times, still more preferably at most 1.8 times, far more preferably at most 1.7 times larger than that in the uppermost layer of the inner surface thereof.

In another aspect, the hydrophilic polymer is preferably crosslinked so as to be insoluble. There is no limit in selection of the crosslinking method or the degree of crosslinking. For example, crosslinking by irradiation with γ-rays, electron rays or heat, or chemical crosslinking is carried out. Above all, crosslinking by irradiation with γ-rays or electron rays is preferable, since any residue such as an initiator or the like does not remain, and since the degree of penetration into the materials is high.

The insolubilization, herein referred to, relates to the solubility of the crosslinked hollow fiber membrane in dimethylformamide. The insolubilization of the crosslinked membrane is evaluated as follows: 1.0 g of the crosslinked membrane is cut out and then is dissolved in 100 mL of dimethylformamide, and the insoluble portion of the membrane is visually observed for evaluation. In case of a module filled with a liquid, firstly, the liquid is removed; then, pure water is allowed to pass through the passage on the side of a dialyzate at a rate of 500 mL/min. for 5 minutes; then, similarly, pure water is allowed to pass through the passage on the side of blood at a rate of 200 mL/min. for 5 minutes; and finally, pure water is allowed to pass through the passage from the side of blood to the side of the dialyzate as if permeating the membrane, at a rate of 200 mL/min., so as to wash the membrane. The hollow fiber membrane is removed from the resultant module and is freeze-dried. This freeze-dried membrane is used as a sample for measuring the insoluble component. Also, in case of a dried hollow fiber membrane module, the similar washing is done to prepare a sample for measurement.

The inner surface of the hollow fiber membrane has a two-layer structure attributed to the difference in concentration of the hydrophilic polymer between the uppermost layer and the proximate layer. In the hollow fiber membrane, the sizes of pores therein tend to increase from the dense layer of the inner surface of the membrane toward the outer surface thereof, and therefore, the inner surface of the membrane may have a two-layer structure which has difference in density between the uppermost layer portion and the proximate layer portion. The thickness of the respective layers and the interface therebetween optionally changes depending on the conditions for manufacturing the hollow fiber membrane, and the structures of the layers give some influence on the capacities of the hollow fiber membrane. While it can be recognized that there are seemingly two layers, i.e., the uppermost layer and the proximate layer, in the inner surface of the membrane, a definite interface can not be recognized between the uppermost layer and the proximate layer, in consideration of the situation where the two layers are almost concurrently formed adjacent to each other, when supposing the manufacturing step of the hollow fiber membrane by way of the coagulation thereof. When the distribution curves of the content of the hydrophilic polymer in the interface portion between the two layers are investigated, the distribution curves are connected like a continuous line in many cases. From this fact, it can be supposed that there may be difference in concentration between the two layers, which is attributed to the difference in the content of the hydrophilic polymer. In general, a fault occurs in distribution curves of the content of the hydrophilic polymer in the interface between the two layers, and therefore, there are technical difficulties in the assumption of the formation of two discontinuous layers in which the materials therefor differently behave. It is the best to control the content of the hydrophilic polymer in the uppermost layer to 20 to 40 mass % and the content of the hydrophilic polymer in the proximate layer to 5 to 20 mass %. However, the designing for controlling the content of the hydrophilic polymer in the uppermost layer to, for example, 40 mass % and the content of the hydrophilic polymer in the proximate layer to, for example, 5 mass % may make it impossible for the resultant membrane to sufficiently function, in consideration of the mechanism in which the hydrophilic polymer diffuses and transfers from the proximate layer to the uppermost layer in the surface of the membrane. In other words, it is also important to design the membrane by paying attentions on the simple difference in the content of the hydrophilic polymer between the two layers. For example, the difference (the multiplying factor of at least 1.1) in the content (mass %) of the hydrophilic polymer between the uppermost layer and the proximate layer is converted into the difference in the mass % between the contents of the hydrophilic polymer in the two layers. Then, the simple difference in content of the hydrophilic polymer between the respective layers is adjusted to, preferably about 1 to about 35 mass %, optimally about 5 to about 25 mass %. Under this condition, the diffusion and transfer of the hydrophilic polymer from the proximate layer to the uppermost layer of the surface of the membrane can proceed smoothly. For example, when the content of the hydrophilic polymer in the uppermost layer is 32 mass %, the content of the hydrophilic polymer in the proximate layer is 7 to 27 mass %, which satisfies the above preferable condition, i.e., the multiplying factor of about 1.1 to about 10.

In this regard, the content of the hydrophilic polymer in the uppermost layer of the hollow fiber membrane is measured and calculated by the ESCA method as will be described later, and the absolute value of the content in the uppermost layer portion (having a depth of several to several tens angstrom from the surface layer) of the hollow fiber membrane is determined. In general, it is possible to measure the content of the hydrophilic polymer (e.g., polyvinyl pyrrolidone (PVP)) present in a layer portion which has a depth of up to about 10 nm: (100 angstrom) from the blood-contacting surface of the hollow fiber membrane by the ESCA method (uppermost layer ESCA).

In the meantime, the content of the hydrophilic polymer in the proximate layer of the surface of the hollow fiber membrane is the result of the evaluation of the absolute value of the ratio of the hydrophilic polymer present in a layer portion which has a depth equivalent to several hundreds nm. According to the ATR method (the proximate layer ATR), it is possible to measure the content of the hydrophilic polymer in a layer portion which has a depth of about 1,000 to about 1,500 nm (1 to 1.5 μm) from the blood-contacting surface of the hollow fiber membrane.

The contents of the hydrophilic polymer in the inner surface and the outer surface of the hollow fiber membrane may have some connection with the molecular weight of the hydrophilic polymer. For example, polyvinyl pyrrolidone having a lower molecular weight (about 450,000) shows a higher solubility and is eluted in a larger amount in the coagulation of a hollow fiber membrane, and largely diffuses and transfers, as compared with polyvinyl pyrrolidone having a high molecular weight (about 1,200,000). For these reasons, there is formed a hollow fiber membrane which has relatively high concentrations of the hydrophilic polymer, that is, 20 to 40 mass % of the hydrophilic polymer in the uppermost layer portion and 5 to 20 mass % of the hydrophilic polymer in the proximate layer portion in the surface of the membrane, in comparison with an average mass ratio (1 to 20 mass %) of the hydrophilic polymer relative to the polysulfone type polymer. A hollow fiber membrane may be formed using polyvinyl pyrrolidones having different molecular weights in combination; for example, when a hollow fiber membrane is manufactured from 80 mass % of a polysulfone type resin, and 15 mass % of a polyvinyl pyrrolidone having a molecular weight of 900,000 and 5 mass % of a polyvinyl pyrrolidone having a molecular weight of about 45,000, the contents of the polyvinyl pyrrolidones in the two layers and the capacities of the hollow fiber membrane may sometimes be influenced. Designing of a hollow fiber membrane made from this point of view is also included in the scope of the present invention.

To attain the foregoing features 2, 3 and 4 of the present invention, for example, the mass ratio of the hydrophilic polymer to the hydrophobic polymer is controlled within the above specified range, and the conditions for manufacturing the hollow fiber membrane are optimally controlled. In concrete, preferably, a dense layer formed on the side of the inner surface of the hollow fiber membrane has a two-layer structure which has difference in density between the uppermost layer portion and the proximate layer portion. When the mass ratio of the polysulfone type polymer to the hydrophilic polymer in the spinning dope, and the concentration and temperature of an interior-coagulating solution are controlled within ranges as will be explained later, the coagulating rates and/or the phase-separating rates of the uppermost layer portion and the proximate layer portion of the inner surface of the hollow fiber membrane become different from each other, and also, the polysulfone type polymer and the hydrophilic polymer become different from each other in the solubility in a solvent/water. These differences are considered to exhibit the features 2 and 3, although the particular reasons therefor are not known.

Regarding the feature 4, the important point is to optimize the conditions for drying the hollow fiber membrane: when a wet hollow fiber membrane is dried, the hydrophilic polymer dissolved in water tends to transfer from the inner portion of the hollow fiber membrane to the surface thereof, accompanying the transfer of the water. By employing drying conditions as will be described later in this stage, it becomes possible to transfer water at a certain rate and also to make the water-transferring rate constant in a whole of the hollow fiber membrane, so that the hydrophilic polymer in the hollow fiber membrane can immediately transfer to both the surfaces of the membrane without forming any spot. It is assumed that the amount of the hydrophilic polymer transferring to the outer surface of the membrane is larger accordingly, and thus, the feature 4 of the hollow fiber membrane of the present invention is attained, since the evaporation of water from the outer surface of the membrane is larger in amount than that from the inner surface thereof.

The mass ratio of the hydrophilic polymer to the polysulfone type polymer in the spinning dope is preferably 0.1 to 0.6. When the content of PVP in the dope is too small, it may become difficult to control the respective ratios of PVP in the membrane within the ranges specified by the features 2, 3 and 4. Therefore, the ratio of the hydrophilic polymer to the polysulfone type polymer in the dope is preferably at least 0.15, more preferably at least 0.2, still more preferably at least 0.25, and particularly at least 0.3. When the content of PVP in the dope is too large, the content of PVP in the membrane also becomes larger, which requires hard washing of the membrane, resulting in higher cost. Therefore, the ratio of PVP in the dope is more preferably 0.57 or less, still more preferably 0.55 or less.

The interior-coagulating solution is preferably an aqueous solution of 15 to 70 mass % of dimethylacetamide (DMAc). When the concentration of the interior-coagulating solution is too low, the coagulating rate of the inner surface of the membrane becomes higher, which sometimes makes it hard to control the content of the hydrophilic polymer in the proximate layer of the inner surface of the membrane. Therefore, the concentration of the interior-coagulating solution is more preferably 20 mass % or more, still more preferably 25 mass % or more, far more preferably 30 mass % or more. When the concentration of the interior-coagulating solution is too high, the coagulating rate of the inner surface of the membrane becomes lower, which makes it hard to control the content of the hydrophilic polymer in the uppermost layer of the inner surface of the membrane. Therefore, the concentration of the interior-coagulating solution is more preferably 60 mass % or less, still more preferably 55 mass % or less, far more preferably 50 mass % or less. Further, it is preferable to control the temperature of the interior-coagulating solution within a range of −20 to 30° C. When the temperature of the interior-coagulating solution is too low, the uppermost layer of the surface of the membrane may coagulate immediately after the extrusion of the hollow fiber membrane through the nozzle, which makes it hard to control the content of the hydrophilic polymer in the proximate layer of the inner surface of the membrane. Therefore, the temperature of the interior-coagulating solution is more preferably −10° C. or higher, still more preferably 0° C. or higher, far more preferably 10° C. or higher. When the temperature of the interior-coagulating solution is too high, there may be too large a difference in the membrane structure (condensation and rarefaction) between the uppermost layer and the proximate layer in the inner surface of the membrane, which makes it hard to control the contents of the hydrophilic polymer in the uppermost layer and the proximate layer in the inner surface of the membrane. Therefore, the temperature of the interior-coagulating solution is more preferably 25° C. or lower, still more preferably 20° C. or lower. By controlling the temperature of the interior-coagulating solution within the above specified range, it becomes possible to inhibit the bubbling of the gases dissolved in the interior-coagulating solution, when the interior-coagulating solution is extruded through the nozzle. By inhibiting the bubbling of the gasses dissolved in the interior-coagulating solution, such secondary effects are produced that the breaking of the membrane just under the nozzle and the formation of knobs on the membrane can be suppressed. To control the temperature of the interior-coagulating solution within the above specified range, it is preferable to provide a heat exchanger in the piping from the interior-coagulating solution tank to the nozzle.

In one of specific preferred examples of drying wet hollow fiber membranes, a bundle of wet hollow fiber membranes is put in a microwave drier and is dried under irradiation with microwave of 0.1 to 20 kW and under a reduced pressure of 20 kPa or lower. The higher an output of microwave is, the better, in consideration of the reduction of drying time. However, it is preferable not to excessively increase the output of microwave, since the hydrophilic polymer in the hollow fiber membrane, if excessively dried or heated, is deteriorated or decomposed, or the membrane tends to lower in wettability in use. Therefore, the output of microwave is more preferably 18 kW or lower, still more preferably 16 kW or lower, far more preferably 14 kW or lower. While even lower than 0.1 kW of output of microwave is possible to dry a bundle of hollow fiber membranes, longer drying time is required, which may lead to less treating amount. The output of microwave is therefore more preferably 0.15 kW or higher, still more preferably 0.2 kW or higher. The reduced pressure which is employed in combination with the output of microwave is more preferably 15 kPa or lower, still more preferably 10 kPa or lower, which may vary depending on the moisture content of the bundle of the hollow fiber membranes, found before the drying step. The lower the reduced pressure is, the better, since the drying speed can be more quicker. However, the lower limit of the reduced pressure is preferably 0.1 kPa, more preferably 0.2 kPa or higher, still more preferably 0.3 kPa or higher, in consideration of an increased cost for improving the sealing degree of the system. Preferably, the optimum values of the output of microwave and the reduced pressure are determined by experiments, because such optimum values change depending on the moisture content of the bundle of hollow fiber membranes and the number of hollow fiber membranes in the bundle.

For example, the referential drying conditions of the present invention are described: when a bundle of 20 hollow fiber membranes, each of which has a moisture content of 50 g per membrane, is dried, the total moisture content is 1,000 g (50 g×20=1,000 g), and the output of microwave suitable for this total moisture content is 1.5 kW, and the reduced pressure suitable therefor is 5 kPa.

The frequency of the irradiated microwave is preferably 1,000 to 5,000 MHz, more preferably 1,500 to 4,500 MHz, still more preferably 2,000 to 4,000 MHz, in consideration of the inhibition of the formation of irradiation spots on the bundle of hollow fiber membranes, and the effect of pushing water out of the pores of the membranes.

It is important to uniformly heat and dry the bundle of hollow fiber membranes while the membranes being dried by the exposure of microwave. In this microwave drying, reflected waves incidental to the generation of microwaves cause non-uniform heating, and therefore, it is important to employ a means for reducing the non-uniform heating which is caused by the reflected waves. Such a means is not limited and may be an optional one: for example, a reflecting plate is provided in an oven to reflect the reflected waves thereon to thereby uniform the heating, as disclosed in JP-A-2000-340356.

Preferably, the hollow fiber membranes are dried within 5 hours under a combination of the application of microwaves and under the above reduced pressure. When the drying time is too long, the transfer speed of water in the hollow fiber membrane is low, which may give some influence on the transfer of the hydrophilic polymer dissolved in the water. As a result, it becomes impossible to transfer the hydrophilic polymer to the intended site (or layer) in the hollow fiber membrane, or spots attributed to such transfer tend to occur, so that it may become impossible to control the contents of the hydrophilic polymer in the respective sites (or layers). Therefore, the hollow fiber membrane-drying time is more preferably within 4 hours, still more preferably within 3 hours. The shorter the drying time becomes, the better, because of the less transfer amount of the hydrophilic polymer. However, the drying time is preferably 5 minutes or longer, more preferably 10 minutes or longer, still more preferably 15 minutes or longer, when the frequency and output of microwave are suitably selected in combination with the reduced pressure so as to prevent the deterioration or decomposition of the hydrophilic polymer due to the heating and to inhibit the formation of spots during the drying step.

Further, the highest temperature of the hollow fiber membrane while being dried is preferably 80° C. or lower. When this temperature is too high, there is a danger of the hydrophilic polymer's deterioration and decompostion. Therefore, the temperature of the hollow fiber membrane being dried is more preferably 75° C. or lower, still more preferably 70° C. or lower. On the contrary, when this temperature is too low, the drying time becomes longer, which may make it hard to control the amounts of the hydrophilic polymer in the respective sites of the hollow fiber membrane, as described above. Therefore, the drying temperature is preferably 20° C. or higher, more preferably 30° C. or higher, still more preferably 40° C. or higher.

Further, it is preferable not to bone-dry the hollow fiber membrane. If bone-dried, the wettability of the hollow fiber membrane tends to lower when the membrane is again wetted for use, or the hydrophilic polymer becomes hard to absorb water and may be easily eluted from the hollow fiber membrane. Therefore, the moisture content of the dried hollow fiber membrane is preferably 1 wt. % or more, more preferably 1.5 wt. % or more. When the moisture content of the hollow fiber membrane is too high, the propagation of bacteria may be facilitated, or the hollow fiber membrane may be crushed by its own weight, during the storage thereof. Therefore, the moisture content of the hollow fiber membrane is preferably 5 wt. % or less, more preferably 4 wt. % or less, still more preferably 3 wt. % or less.

In the present invention, the rate of pore area of the outer surface of the hollow fiber membrane is preferably 8 to 25%, and the average pore area of the opened portion of the outer surface of the hollow fiber membrane is preferably 0.3 to 1.0 $\mu m^2$. These specific conditions are effective to impart the above features to the hollow fiber membrane, and thus are preferred embodiments. When the rate of pore area is less than 8% and when the average pore area is less than 0.3 $\mu m^2$, the coefficient of water permeability tends to lower. Further, such hollow fiber membranes tend to stick to one another due to the hydrophilic polymer present on the outer surfaces of the membranes while the membranes are being dried, and thus are hard to be incorporated into a module. Therefore, the rate of pore area is more preferably 9% or more, still more preferably 10% or more. The average pore area is more preferably 0.4 $\mu m^2$ or more, still more preferably 0.5 $\mu m^2$ or more, far more preferably 0.6 $\mu m^2$ or more. On the contrary, when the rate of pore area exceeds 25% and when the average pore area exceeds 1.0 $\mu m^2$, the burst pressure tends to lower. Therefore, the rate of pore area is more preferably 23% or less, still more preferably 20% or less, far more preferably 17% or less, and particularly 15% or less. The average pore area is more preferably 0.95 $\mu m^2$ or less, still more preferably 0.90 $\mu m^2$ or less.

In order to control the content of the hydrophilic polymer and the rate of pore area of the outer surface of the hollow fiber membrane within the above specified ranges, the optimization of the conditions for washing the manufactured hollow fiber membranes is also effective, in addition to the adjustment of the mass ratio of the hydrophilic polymer to the polysulfone type polymer in the spinning dope and the optimization of the conditions for drying the hollow fiber membranes. As the membrane-manufacturing conditions, it is effective to optimize the temperature and humidity of the air gap of the outlet of a nozzle, the dope-drawing condition and the temperature and the composition of an exterior-coagulating bath. As the washing method, washing with hot water or alcohol and centrifugal washing are effective. Above all, the optimization of the humidity of the air gap and the composition ratio of a solvent and a non-solvent in the exterior-coagulating bath is particularly effective as the membrane-manufacturing conditions, and the washing with alcohol is particularly effective as the washing method.

Preferably, the air gap is enclosed with a material capable of shielding the air gap from an external air. Preferably, the humidity inside of the air gap is controlled according to the composition of the spinning dope, the temperature of the nozzle, the length of the air gap, and the temperature and composition of the exterior-coagulating bath. For example, a spinning dope (polyethersulufone/polyvinyl pyrrolidone/dimethylacetamide/RO water=10 to 25/0.5 to 12.5/52.5 to 89.5/0 to 10.0) is extruded through a nozzle of 30 to 60° C., and is then allowed to pass through an air gap with a length of 100 to 1,000 mm and is guided to the exterior-coagulating bath which holds a solution having a concentration of 0 to 70 mass % and a temperature of 50 to 80° C. In this case, the absolute humidity of the air gap is 0.01 to 0.3 kg/kg dry air. By controlling the humidity of the air gap within this range, it becomes possible to control the rate of pore area, the average pore area and the content of the hydrophilic polymer of the outer surface of the hollow fiber membrane within the proper ranges, respectively.

The exterior-coagulating solution is preferably an aqueous solution of 0 to 50 mass % of DMAc. When the concentration of the exterior-coagulating solution is too high, the rate of pore area and the average pore area of the outer surface of the hollow fiber membrane become too large, which may induce a danger of accelerating the backflow of endotoxin to the side of blood during hemodialysis. Therefore, the concentration of the exterior-coagulating solution is more preferably 40 mass % or less, still more preferably 30 mass % or less, far more preferably 25 mass % or less. On the contrary, when the concentration of the exterior-coagulating solution is too low, a large amount of water is needed to dilute the solvent which is brought from the spinning dope, and the cost for disposal of waste liquid increases. Therefore, the lower limit of the exterior-coagulating solution is more preferably 5 mass % or more.

In the manufacturing of the hollow fiber membrane of the present invention, it is preferable not to substantially draw the hollow fiber membrane before the structure of the hollow fiber membrane has been fixed. The wording of "not to substantially draw the hollow fiber membrane" means that the velocities of rollers used in the spinning step are so controlled as not to loose or excessively pull a filament-like spinning dope extruded through a nozzle. The ratio of the linear velocity of the extrusion to the velocity of the first roller in the coagulating bath (draft ratio) is preferably 0.7 to 1.8. When this ratio is less than 0.7, the hollow fiber membrane being fed may be loosen, which leads to poor productivity. When this ratio exceeds 1.8, the structure of the membrane may be destructed: for example, the dense layer of the hollow fiber membrane is spilt. The draft ratio is more preferably 0.85 to 1.7, still more preferably 0.9 to 1.6, and particularly 1.0 to 1.5. When the draft ratio is adjusted within this range, the deformation or destruction of pores can be prevented, and the clogging of the pores of the membrane with the protein in blood can be prevented. Thus adjusted, the hollow fiber membrane can exhibit stable performance with time, and sharp fractional properties.

The hollow fiber membrane having passed through the water bath is directly wound in a wet state onto a hank, so as to make up a bundle of 3,000 to 20,000 hollow fiber membranes. Then, the resulting bundle of hollow fiber membranes is washed to remove the excessive solvent and hydrophilic polymer. In the present invention, preferably, the bundle of hollow fiber membranes is immersed in hot water of 70 to 130° C., or an aqueous solution of 10 to 40 vol. % of ethanol or isopropanol of a room temperature to 50° C. for washing.

(1) In the washing with hot water, the bundle of hollow fiber membranes is immersed in excessive RO water and treated at a temperature of 70 to 90° C. for 15 to 60 minutes, and then is removed from the bath and subjected to centrifugal dehydration. This operation is repeated 3 or 4 times while RO water is being replaced.

(2) The bundle of hollow fiber membranes immersed in excessive RO water in a compressed container may be treated at 121° C. for about 2 hours.

(3) In the washing with an aqueous solution of ethanol or isopropanol, preferably, the same operation as the above operation (1) is repeated.

(4) Also preferably, the bundle of hollow fiber membranes is radially laid in a centrifugal washing machine and is subjected to centrifugal washing for 30 minutes to 5 hours, while washing water is being shower-like blown thereonto at an angle of 40 to 90° from the center of the rotation.

Each of the above washing methods may be carried out in combination with one or more of the above methods. When the treating temperature is too low in any of the above methods, it is needed to increase the washing times in number, which may lead to higher cost. On the contrary, when the treating temperature is too high, the decomposition of the hydrophilic polymer is accelerated, and thus, the washing efficiency, on the contrary, may become poor. By washing the bundle of hollow fiber membranes as above, the ratio of the hydrophilic polymer present on the outer surface of the membrane is properly controlled, which makes it possible to inhibit the sticking of the membranes and to decrease the amount of eluted substances.

In the present invention, it is important to concurrently attain the foregoing features 1 to 4 to thereby make it possible to satisfy all the foregoing properties.

Because of having the foregoing features, the bundle of hollow fiber membranes of the present invention is preferably used in a blood purifier.

When used in a blood purifier, preferably, hollow fiber membranes having a burst pressure of 0.5 MPa or higher are used, and the coefficient of water permeability of the blood purifier is 150 mL/m$^2$/hr/mmHg or more.

The burst pressure herein referred to is an index of the pressure resistant capacity of hollow fiber membranes made into a module. The burst pressure is measured as follows: the interior space of the hollow fiber membrane is compressed with an air while the compression pressure is being gradually increased, and a pressure which bursts the hollow fiber membrane when the membrane can not withstand the internal pressure thereof is measured. The higher the burst pressure is, the less the latent defects of the hollow fiber membrane are which will cause cutting and pin pores in the hollow fiber membrane in use. Therefore, the burst pressure is preferably 0.5 MPa or higher, more preferably 0.7 MPa or higher and particularly 1.0 MPa or higher. When the burst pressure is lower than 0.5 MPa, it may be impossible to detect such latent defects of the hollow fiber membrane that leads to the leakage of blood as will be described later. While a higher and higher burst pressure is preferred, it may become impossible to obtain a desired membrane performance, if the thickness of the membrane is increased or the void ratio is excessively decreased in order to increase the burst pressure. Therefore, the burst pressure is preferably lower than 2.0 MPa, more preferably lower than 1.7 MPa, still more preferably lower than 1.5 MPa and particularly lower than 1.3 MPa, when the hollow fiber membranes are used in a hemodialyzer.

In the mean time, when the coefficient of water permeability is less than 150 mL/m$^2$/hr/mmHg, the solute permeability tends to lower. When the size or the number of the pores of the membrane is increased in order to improve the solute permeability, the strength of the membrane tends to lower or defects are caused in the membrane. In one of the preferred hollow fiber membranes of the present invention, a decreased resistance to solute-permeation and an improved strength of the membrane can be concurrently achieved in good balance by optimizing the pore size of the outer surface of the membrane, thereby optimizing the void ratio of the support layer portion in the outer surface of the membrane. The coefficient of water permeability is more preferably 200 mL/m$^2$/mmHg or more, still more preferably 300 mL/m$^2$/mmHg or more, far more preferably 400 mL/m$^2$/mmHg or more, and particularly 500 mL/m$^2$/mmHg or more. On the other hand, when the coefficient of water permeability is too high, the water-removing control during a hemodialysis therapy becomes hard. Therefore, the coefficient of water permeability is preferably 2,000 mL/m$^2$/mmHg or less, more preferably 1,800 mL/m$^2$/mmHg or less, still more preferably 1,500 mL/m$^2$/mmHg or less, far more preferably 1,300 mL/m$^2$/mmHg or less, and particularly 1,000 mL/m$^2$/mmHg or less.

In the final stage for providing a commercial product, a module for use in blood purification is usually subjected to a leak test in which the interior or the exterior of a hollow fiber is pressurized with an air in order to check any defect of the hollow fiber or the module. When a leak is detected by the compressed air, such a module is scraped as a defective or such a defect is repaired. The air pressure for use in the leak test is, in many cases, several times larger than the proof pressure of hemodialyzers (generally 500 mmHg). Microflaws, crushing or splitting of very highly water permeable hollow fiber membranes for use in blood purification, which can not be detected by any of the conventional pressurizing leak tests, cause the cutting or pin pores of the hollow fiber membranes, in the course of the manufacturing steps after the leak test (mainly in the step of sterilization or packing), in the course of transporting, or in the course of handling in a clinical site (unpacking or priming); and such cutting or pin pores in the membranes cause troubles such as the leakage of blood during a therapy. These troubles can be avoided by specifying the burst pressure as above.

The non-uniformity in thickness of hollow fiber membranes is also effective to suppress the occurrence of the foregoing latent defects. The non-uniformity in thickness means the non-uniformity of the thickness of 100 hollow fiber membranes in a module, when the sections of the hollow fiber membranes are observed. The smaller the value of the non-uniformity indicated by a ratio of a maximum value of the thickness to a minimum value thereof, the better. Preferably, the non-uniformity per 100 hollow fiber membranes is 0.6 or more. When even only one hollow fiber membrane having a non-uniformity of smaller than 0.6 is included in 100 follow fiber membranes, such a hollow fiber membrane may cause a latent defect which will lead to the leakage of blood during a clinical therapy. Therefore, the non-uniformity referred to in the present invention is not an average value of non-uniformity of the 100 follow fiber membranes but a minimum value thereof. The higher the non-uniformity, the better, because the uniformity of the membranes is improved to thereby suppress the manifestation of latent defects of the membranes, which leads to an increase in the burst pressure. Therefore, the non-uniformity is more preferably 0.7 or more. When the non-uniformity is smaller than 0.6, the latent defects of the membranes tend to occur as actual defects, so that the burst pressure becomes lower and that the leakage of blood from the membranes tends to occur.

To control the non-uniformity in the thickness of the membrane to 0.6 or more, for example, it is preferable to strictly uniform the width of the slit of a nozzle, namely, the outlet for discharging the membrane-forming solution. Generally used as a spinning nozzle for hollow fiber membranes is a tube-in-orifice type nozzle which has an annular portion for discharging a spinning dope and a hole for extruding an interior-coagulating solution for forming a hollow portion, inside the annular portion. The width of the slit indicates the width of the outer annular portion for discharging the spinning dope. By lessening the variation of the width of the slit, the non-uniformity of the thickness of a spun hollow fiber membrane can be decreased. Specifically, the ratio of a maximum value to a minimum value of the width of the slit is controlled to 1.00 to 1.11, and preferably, the difference between the maximum value and the minimum value is adjusted to 10 μm or less, more preferably 5 μm or less. Also effective are the optimization of the temperature of the nozzle, the decrease of spots of the interior-coagulating solution formed in the course of manufacturing membranes, the optimization of the multiplying factor of the drawing, etc.

To further increase the burst pressure, the flaws of the surfaces of the hollow fiber membranes and the foreign matters and bubbles included in the membranes are lessened to thereby decrease the latent defects of the membranes. To prevent the occurrence of flaws on the membranes, it is effective to optimize the conditions of the materials for rollers and guides used in the steps of manufacturing hollow fiber membranes, and the roughness of the surfaces of the materials. It is also effective to decrease the number of times of contact between a module casing and the hollow fiber membranes or the number of frictions between each of the hollow fiber membranes, when the bundle of the hollow fiber membranes is incorporated into the module. In the present invention, the rollers to be used is preferably planished at their surfaces in order to prevent the hollow fiber membranes from slipping and having flaws on the surfaces thereof. The surfaces of the guides to be used are preferably matte-finished or knurly finished to reduce the resistance attributed to the contact with the hollow fiber membranes as much as possible. The bundle of hollow fiber membranes is not directly inserted into the module casing, but preferably, the bundle of hollow fiber membranes wrapped in a matte-finished film is inserted in the module casing, and then, only the film is removed from the module casing.

To prevent the hollow fiber membranes from including foreign matters, it is effective to use materials containing less foreign matters, or to decrease the amount of foreign matters by filtering the spinning dope for forming the membranes. In the present invention, the spinning dope is preferably filtered through a filter having pores with a diameter smaller than the thickness of the hollow fiber membranes. Specifically, the spinning dope which is homogeneously dissolved is allowed to pass through a sintered filter which has pores with diameters of 10 to 50 μm and which is located on a passage along which the spinning dope is guided from the dissolution tank to the nozzle. The filtering may be done at least once, however, it is preferable to make the filtering treatment in a plurality of steps using filters whose pores become smaller in diameter in the latter steps, in order to improve the filtering efficiency and to prolong the life of the filter. The diameter of the pores of the filter is preferably 10 to 45 μm, more preferably 10 to 40 μm. When the diameter of the pores of the filter is too small, the back pressure increases, and the quantitative evaluation degrades.

To prevent the inclusion of bubbles in the membranes, it is effective to degass the polymer solution for forming membranes. Stationary degassing or decompression degassing may be employed in accordance with the viscosity of the spinning dope. In concrete, the inner space of a dissolution tank is decompressed to −100 to −760 mmHg, and then is sealed, and the tank is left to stand in a still state for 5 to 30 minutes. This operation is repeated several times for degassing the tank. When the decompression degree is too low, it may be needed to increase the number of times of degassing, which requires longer time. When the decompression degree is too high, high cost is often needed to improve the sealing degree of the system. The total time for the degassing treatment is preferably 5 minutes to 5 hours. When the treating time is too long, the hydrophilic polymer may be deteriorated or decomposed due to the decompression effect. When the treating time is too short, the effect of degassing may become poor.

EXAMPLES

Hereinafter, the present invention will be explained by way of Examples thereof, which should not be construed as limiting the scope of the present invention in any way. The methods of evaluating the physical properties of the following Examples are described below.

1. Coefficient of Water Permeability

The circuit on the side of the blood outlet in a dialyzer (on the side of the outlet from a pressure-measuring point) was blocked with a forceps. A compression tank was charged with pure water maintained at 37° C., and the pure water was fed to the blood passage of the dialyzer insulated in a constant-temperature bath of 37° C. while the pressure in the bath was being controlled with a regulator, and the mass of a filtrate flowing out of the side of the dialyzate passage was measured. The difference in pressure between each of the membranes (TMP) is expressed by the equation:

$$TMP=(Pi+Po)/2$$

[in the equation, Pi represents the pressure on the side of the inlet of the dialyzer; and Po, the pressure on the side of the outlet thereof]. The TMP was varied at four points, and the flow amount of the filtration was measured, and the coefficient of water permeability (mL/hr·/mmHg) was calculated from the gradient indicting the relationship between TMP and the flow amount of the filtration. At this point of time, the coefficient of correlation between TMP and the flow amount of the filtration must be 0.999 or more. To reduce an error in pressure loss due to the circuit, TMP was measured within a pressure range of 100 mmHg or lower. The coefficient of water permeability of the hollow fiber membrane was calculated from the area of the membrane and the coefficient of water permeability of the dialyzer:

$$UFR(H)=UFR(D)/A$$

[in the equation, UFR(H) represents the coefficient of water permeability (mL/m$^2$/hr/mmHg) of the hollow fiber membrane; UFR(D) represents the coefficient of water permeability (mL/hr/mmHg) of the dialyzer; and A represents the area (m$^2$) of the membrane in the dialyzer].

2. Calculation of the Area of Membranes

The area of membranes in the dialyzer was calculated based on the inner diameter of the hollow fiber membrane as a reference:

$$A=n \times \pi \times d \times L$$

[in the equation, n represents the number of hollow fiber membranes in the dialyzer; π represents the ratio of the circumference of a circle to its diameter; d represents the inner diameter (m) of the hollow fiber membrane; and L represents the effective length (m) of the hollow fiber membrane in the dialyzer].

3. Burst Pressure

The dialyzate side of a module comprising about 10,000 hollow fiber membranes was filled with water and was then capped. A dry air or nitrogen was fed from the blood side of the module at a room temperature so as to compress the module at a rate of 0.5 MPa/min. The pressure was increased so that the hollow fiber membranes were burst by the compressed air. Then, the air pressure was measured, when bubbles occurred in the liquid filling the dialyzate side of the module, simultaneously with the bursting of the membranes. This air pressure was defined as a burst pressure.

4. Non-Uniformity in Thickness

The sections of 100 hollow fibers were observed with a projector of a magnification of 200. One hollow fiber which had portions whose sections had the largest difference in thickness was selected from 100 hollow fibers in one field of view, and the largest thickness and the smallest thickness of this hollow fiber were measured.

The non-uniformity in thickness =the thickness of the thinnest portion/the thickness of the thickest portion In this regard, the thickness of a membrane is perfectly uniform when the non-uniformity of thickness is one (=1)

5. Amount of Hydrophilic Polymer Eluted

A method of measuring the amount of polyvinyl pyrrolidone, as a hydrophilic polymer, eluted from a membrane is described.

<Dry Hollow Fiber Membrane Module>

A physiological saline was allowed to pass through the passage on the side a dialyzate in a module, at a rate of 500 mL/min. for 5 min., and then was allowed to pass through the passage on the side of blood, at a rate of 200 mL/minutes. After that, the physiological saline was allowed to flow from the side of blood to the side of the dialyzate at a rate of 200 mL/minute for 3 min. while being filtered.

<Wet Hollow Fiber Membrane Module>

The liquid was removed from the module, and the same operation as was done on the dry hollow fiber membrane module was repeated.

Extraction was made on the hollow fiber membrane module which had been subjected to the above priming treatment, according to the method regulated in the approved criteria for manufacturing dialyzer type artificial kidney, and polyvinyl pyrrolidone in the extract was determined by a calorimetric method.

In detail, pure water (100 mL) was added to the hollow fiber membranes (1 g), and extraction was made on the hollow fiber membranes at 70° C. for one hour. To the resultant extract (2.5 mL), a 0.2 mol aqueous citric acid solution (1.25 mL) and a 0.006N aqueous iodine solution (0.5 mL) were added, and the mixture was sufficiently mixed and was left to stand alone at a room temperature for 10 minutes. After that, the absorbance of the mixture was measured at 470 nm. The determination was made using polyvinyl pyrrolidone as a sample, based on the analytical curve determined by the measurement according to the above method.

6. Contents of Hydrophilic Polymer in Uppermost Layers of Inner and Outer Surfaces of Membrane The content of a hydrophilic polymer was determined by the X-ray photoelectron spectroscopy (ESCA method). Analysis using polyvinyl pyrrolidone (PVP) as a hydrophilic polymer is herein explained.

One hollow fiber membrane (obliquely cut with a cutter so as to expose a part of the inner surface of the membrane) was applied on a sample table to be analyzed by the ESCA method. The conditions for the analysis were as follows:

Apparatus: ULVAC-PHI ESCA5800
Excitation X-ray: MgKα ray
X-ray output: 14 kV, 25 mA
Escape angle of photoelectron: 45°

Analyzed diameter: 400 μmφ
Pass energy: 29.35 eV
Resolution: 0.125 eV/step
Degree of vacuum: about $10^{-7}$ Pa or lower The content of PVP in the surface of the membrane was calculated from the found value of nitrogen (N) and the found value of sulfur (S), by the following equation.

<Membrane of PES (Polyethersulfone) Admixed with PVP>

Content of PVP (Hpvp)[mass %]=100×($N$×111)/($N$×111+$S$×232)

<Membrane of PSf (Polysulfone) Admixed with PVP>

Content of PVP (Hpvp)[mass %]=100×($N$×111)/($N$×111+$S$×442)

7. Content of Hydrophilic Polymer in a Whole of Hollow Fiber Membrane

Measurement using PVP as a hydrophilic polymer is described as one of examples. A sample was dried with a vacuum drier at 80° C. for 48 hours, and 10 mg of the dried sample was analyzed with a CHN coder (Model MT-6, manufactured by YANAKO BUNSEKI KOGYOSHA). The mass ratio of PVP was calculated from the content of nitrogen by the following equation.

The mass ratio of PVP (mass %)=the content of nitrogen (mass %)×111/14

8. Content of Hydrophilic Polymer in Proximate Layer of Surface of Hollow Fiber Membrane on Blood-Contacting Side Measurement using PVP as a hydrophilic polymer is described as one of examples. The measurement was conducted by an infrared absorbing analysis. A sample made up in the same manner as in the above item 6 was used. The content of PVP in the proximate layer of the surface of the sample membrane was measured by the ATR method, and the content of PVP in a whole of the membrane was measured by the transmission method. In the ATR method, an infrared absorption spectrum was measured by using a diamond 45° as an internal reflecting element. Model IRμs/SIRM manufactured by SPECTRA TECH was used for the measurement. The ratio of the absorption intensity Ap of the peak derived from C=O of PVC at and around 1675 $cm^{-1}$ in the infrared absorption spectrum, to the absorption intensity As of the peak derived from a polysulfone type polymer at and around 1580 $cm^{-1}$, i.e., Ap/As, was determined. In the ATR method, the absorption intensity depends on the measured wave number. Therefore, as a correction value, the ratio of the position of the peak vs of the polysulfone type polymer and the position of the peak vp (wave number) of PVP, i.e., vp/vs was measured. The content of PVP in the proximate layer in the surface of the membrane on the blood-contacting side was calculated by the following equation:

Content (mass %) of Hydrophilic Polymer in Proximate Layer of Surface of Membrane=$Cav$×($Ap/As$)×($vp/vs$)

In this equation, Cav is the mass ratio of PVP determined by "Content of Hydrophilic Polymer in a Whole of Hollow Fiber Membrane" mentioned above.

9. Rate of Pore Area of Outer Surface of Hollow Fiber Membrane

The outer surface of a hollow fiber membrane was observed with an electron microscope of a magnification of 10,000 and photographed (SEM photograph). The obtained image was processed with an image analysis processing soft to determine the rate of pore area of the outer surface of the hollow fiber membrane. For example, "Image Pro Plus" (Media Cybernetics, Inc.) was used as the image analysis processing soft for measurement. The fetched image was subjected to an emphasis and filter operation so as to discriminate the pore portions from the closed portions. After that, the number of the pores was counted. If polymer chains of the lower layer were observed in the interiors of the pores, such pores were combined and regarded as one pore. The total (B) of the area (A) within the measured range and the area of the pores within the measured range was calculated, and the rate of pore area (%) was calculated by the equation: the rate of pore area (%)=(B/A)×100. This calculation was repeated with respect to 10 fields of view, and an average of the results was found. Scale-setting was carried out as the initiating operation, and the pores on the boundary around the measured range were not excluded from the counting.

10. Average Pore Area of Open Portion of Outer Surface of Hollow Fiber Membrane

Counting was made in the same manner as in the above operation, to calculate the area of each pore. The pores on the boundary around the measured range were excluded from the counting. This calculation was repeated with respect to 10 fields of view, and an average of all the pore areas was calculated.

11. Blood Leak Test

Bovine blood of 37° C. of which the coagulation was inhibited by the addition of citric acid was fed to a blood purifier at a rate of 200 mL/min., and was filtered at a rate of 20 mL/min. The resulting filtrate was returned to the blood to make a circulating system. After 60 minutes had passed, the filtrate in the blood purifier was collected, and the reddish tone of the filtrate due to the leakage of blood cell was visually observed. This blood leak test was conducted using 30 blood purifiers in each of Examples and Comparative Examples, and the number of modules from which blood leaked was counted.

12. Sticking of Hollow Fiber Membranes

About 10,000 hollow fibers were bundled, and the bundle thereof was set in a module casing of 30 to 35 mmφ. The module casing was sealed with a two-pack type polyurethane resin to make up a module. The leak test was conducted on 5 standard modules. After that, the number of the modules from which the blood leaked due to the defect in the sealing with the urethane resin was counted.

13. Blood Residue in Hollow Fiber Membrane

The side of a dialyzate of a module having a membrane area of 1.5 $m^2$ was filled with physiological saline. A blood bag charged with 200 mL of heparinized blood collected from a healthy person was connected to the module through a tube, and the blood was allowed to circulate at a flow rate of 100 mL/minute at 37° C. for one hour. The blood was sampled before the start of circulation and 60 minutes after the start of circulation, respectively, to count the number of white blood cells and the number of blood platelets. The counted values were corrected by hematocrit values.

Corrected value=Counted value (60 mins.)×Hematocrit (0 min.)/Hematocrit (60 mins.)

The rates of change of the white blood cells and the blood platelets were calculated from the corrected value.

Rate of Change=Corrected value (60 mins.)/the value before the start of circulation×100

After the completion of the circulation for 60 minutes, the blood treated with the physiological saline was retransfused, and the number of the hollow fibers having the blood left to remain therein was counted. The evaluation criteria were based on the number of the hollow fibers having the blood left to remain therein.

10 or less: ○
11 to 30: Δ
31 or more: X

14. Priming Capacity

Distilled water for injection solution was allowed to flow at a rate 200 mL/min. from the inlet port on the side of blood, while the port on the side of a dialyzate being capped. The distilled water was degassed by tapping the module casing 5 times with forceps for 10 seconds from the point of time when the distilled water had reached the outlet port. After that, the number of bubbles passing through for one minute was visually counted. The evaluation criteria were based on the number of bubbles observed:

10 or less/min.: ○
11 to 30/min.: Δ
30 or more/min.: X

Example 1

Polyethersulfone (SUMIKAEXCEL®4800P, manufactured by Sumika Chem Tex Co., Ltd.) (17.6 mass %), polyvinyl pyrrolidone (COLIDONE®K-90 manufactured by BASF) (4.8 mass %), dimethylacetamide (DMAc) (74.6 mass %) and RO water (3 mass %) were homogeneously dissolved at 50° C., and then, the system was vacuumed up to −500 mmHg with a vacuum pump. After that, the system was immediately sealed so as not to change the composition of the membrane-forming solution due to the evaporation of the solvent or the like, and the system in this state was left to stand alone for 15 minutes. This operation was repeated three times so as to degas the membrane-forming solution. This solution was allowed to pass through sintered filters with pore sizes of 30 μm and 15 μm in two stages, and then was extruded from the outer slit of a tube-in-orifice nozzle heated to 65° C. Simultaneously with this extrusion, an aqueous solution of DMAc (45 mass %) of 15° C. as an interior-coagulating solution which had been previously degassed for 60 minutes under a pressure of −700 mmHg was extruded from the hole for the interior-coagulating solution. Then, the solution was allowed to pass through a drying zone with a length of 450 mm, which was shielded from an external air by a spinning tube, and then was coagulated in an aqueous solution of DMAc (20 mass %) heated to 60° C. The resultant membrane in a wet state was directly wound onto a hank. The slit of the tube-in-orifice nozzle used had an average width of 60 μm, a maximum width of 61 μm and a minimum width of 59 μm, and the ratio of the maximum value to the minimum value of the width of the slit was 1.03. The draft ratio of the membrane-forming solution was 1.06.

A bundle of about 10,000 hollow fiber membranes as obtained above was wrapped in a polyethylene film which was matte-finished at its surface on the side of the bundle, and then was cut into bundles of the hollow fiber membranes with lengths of 27 cm. This bundle was washed in hot water of 80° C. for 30 minutes. This washing was repeated 4 times. The bundle of the wet membranes was subjected to centrifugal dehydration at 600 rpm for 5 minutes, and each 12 bundles of the membranes were set on each of two-staged turn tables in the drying apparatus and were exposed to microwaves of initial 1.5 kW with a microwave-generating apparatus in which reflecting plates were provided in the oven for uniform heating. Simultaneously with this operation, the interior space of the drying apparatus was vacuumed to 7 kPa with a vacuum pump, so as to dry the bundles of membranes for 28 minutes. Sequentially, the bundles of membranes were dried under the application of microwaves with an output of 0.5 kW and under reduced pressure 7 kPa for 12 minutes. The output of microwave was decreased to 0.2 kW, under which the bundles of membranes were similarly dried for 8 minutes. Thus, the drying of the bundles of membranes was completed. In addition, this drying was carried out by the microwave application in combination with far infrared radiation. The highest temperature of the surface of the bundle of membranes at this time was 65° C., and the moisture content of the dried hollow fiber membrane was 2 mass % on average. The inner diameter of the hollow fiber membrane was 199.1 μm, and the thickness thereof was 28.5 μm. The rollers used, with which the hollow fiber membranes came into contact during the spinning step, were planished at their surfaces, and all the guides used were matte-finished at their surfaces.

A blood purifier was made up of the hollow fiber membranes thus obtained, and was used for leak tests. As a result, no failure in adhesion, attributed to the sticking of the hollow fiber membranes, was observed.

The blood purifier was filled with RO water, and was irradiated with γ-rays of an absorbed dose of 25 kGy for crosslinking the membranes. After the γ-ray irradiation, the hollow fiber membranes were cut out from the blood purifier, and the cut pieces of the hollow fiber membranes were subjected to an elution test. As a result, the amount of the eluted PVP was 4 ppm, which was in the level of no problem. Further, the outer surfaces of the hollow fiber membranes removed from the blood purifier were observed with a microscope. As a result, any defect such as flaws or the like was not observed.

Fresh bovine blood admixed with citric acid was allowed to pass through the blood purifier at a flow rate of 200 mL/min. and at a filtering rate of 10 mL/min. As a result, no leakage of blood cells was observed. The amount of endotoxin filtered from the outside of the hollow fiber membrane to the inside thereof was smaller than the limit for detection, which was in the level of no problem. The results of other analyses are shown Table 1.

Comparative Example 1

Wet hollow fiber membranes were obtained in the same manner as in Example 1, except that the amounts of polyvinyl pyrrolidone (COLIDONE®K-90 manufactured by BASF) and DMAC of a spinning dope were changed to 2.4 mass % and 77 mass %, respectively, and that a drying zone with a length of 700 mm was used. The resultant hollow fiber membranes were washed in the same manner as in Example 1, and dried in a hot air drier of 60° C. The moisture content of the resultant hollow fiber membrane was 3.4 mass %, and the inner diameter thereof was 199.5 μm, and the thickness thereof was 29.8 μm. The characteristics of the resultant bundle of hollow fiber membranes and the resultant blood purifier are shown in Table 1. Many of the hollow fiber membranes of Comparative Example 1 had the blood left to remain therein. This was because the content of PVP in the proximate layer of the inner surface of this membrane was low.

Comparative Example 2

A spinning dope was obtained in the same manner as in Example 1, except that the amount of PVP (COLIDONE®K-

90 manufactured by BASF) was changed to 12.0 mass %, and the amount of DMAc, to 67.4 mass %. Further, a bundle of hollow fiber membranes and a blood purifier were obtained in the same manners as in Example 1, except that the temperature of the void-forming agent was not controlled, that the hollow fiber membranes were not washed, and that the bundle of hollow fiber membranes was dried in the same manner as in Comparative Example 1. The characteristics of the resultant bundle of hollow fiber membranes and the resultant blood purifier are shown in Table 1. The hollow fiber membrane obtained in this Comparative Example had a higher content of PVP in the uppermost layer of the inner surface thereof, and the amount of eluted PVA was larger. In addition, the permeation of endotoxin into the blood side was observed because of the higher content of the hydrophilic polymer in the outer surface of the hollow fiber membrane.

Comparative Example 3

A bundle of hollow fiber membranes and a blood purifier were obtained in the same manners as in Comparative Example 2, except that the time of the hot water washing was changed to 6 hours. The characteristics of the resultant bundle of hollow fiber membranes and the resultant blood purifier are shown in Table 1. The hollow fiber membrane obtained in this Comparative Example had a lower content of PVP in the uppermost layer of the outer surface thereof, and thus, the priming capacity was inferior due to the lower hydrophilicity of the outer surface thereof.

Example 2

Polyethersulfone (SUMIKAEXCEL®4800P, manufactured by Sumika Chem Tex Co., Ltd.) (18.8 mass %), polyvinyl pyrrolidone (COLIDONE®K-90 manufactured by BASF) (5.2 mass %), DMAc (71.0 mass %) and water (5 mass %) were dissolved at 50° C., and then, the system was vacuumed up to −700 mmHg with a vacuum pump. After that, the system was immediately sealed so as not to change the composition of the membrane-forming solution due to the evaporation of the solvent or the like, and the system in this state was left to stand alone for 10 minutes. This operation was repeated three times so as to degas the membrane-forming solution. This solution was allowed to pass through filters with pore sizes of 15 µm and 15 µm in two stages, and then was extruded from the outer slit of a tube-in-orifice nozzle heated to 70° C. Simultaneously with this extrusion, an aqueous solution of DMAc (55 mass %) of 10° C. as an interior-coagulating solution which had been previously degassed for 2 hours under a pressure of −700 mmHg was extruded from the hole for the interior-coagulating solution. The resultant hollow fiber membrane was allowed to pass through an air gap with a length of 330 mm, which was blocked from an external air by a spinning tube, and then was coagulated in water of 60° C. The slit of the tube-in-orifice nozzle used had an average width of 45 µm, a maximum width of 45.5 µm and a minimum width of 44.5 µm, and the ratio of the maximum value to the minimum value of the width of the slit was 1.02. The draft ratio of the membrane-forming solution was 1.06. The absolute humidity of the drying zone was 0.12 kg/kg dry air. The hollow fiber membrane removed from the coagulating bath was allowed to pass through a water bath of 85° C. for 45 seconds to remove the solvent and the excessive hydrophilic polymer, and then was wound up. A bundle of about 10,000 hollow fiber membranes as obtained above was wrapped in the same polyethylene film as that used in Example 1, and then was immersed in an aqueous solution of 40 vol. % of isopropanol of 30° C. for 30 minutes. This immersion was repeated twice, and this aqueous solution was replaced with water.

The bundle of the wet hollow fiber membranes was subjected to centrifugal dehydration at 600 rpm for 5 minutes, and each 48 bundles of the membranes were set on each of turn tables in two stages in the drying apparatus and were exposed to microwaves of initial 7 kV. Simultaneously with this operation, the interior space of the drying apparatus was vacuumed to 5 kPa with a vacuum pump, so as to dry the bundles of membranes fro 65 minutes. Sequentially, the bundles of membranes were dried under the application of microwaves with an output of 3.5 kV and under reduced pressure of 5 kPa for 50 minutes. The output of microwave was decreased to 2.5 kW, under which the bundles of membranes were similarly dried for 10 minutes. Thus, the drying of the bundles of membranes was completed. The highest temperature of the surface of the bundle of membranes at this drying treatment was 65° C., and the moisture content of the dried hollow fiber membrane was 2.8 mass % on average. The rollers used for changing the fiber path in the spinning step were planished at their surfaces, and all the guides used were matte-finished at their surfaces. The inner diameter of the hollow fiber membrane was 200.5 µm, and the thickness thereof was 28.2 µm.

A blood purifier was made up of the hollow fiber membranes thus obtained, and was used for leak tests. As a result, no failure in adhesion, attributed to the sticking of the hollow fiber membranes, was observed.

The blood purifier was subjected to the following analyses, without a crosslinking treatment of the hydrophilic polymer. The hollow fiber membranes were cut out from the blood purifier which had not been irradiated with γ-rays, and the cut pieces of the hollow fiber membranes were subjected to an elution test. As a result, the amount of the eluted PVP was 7 ppm, which was in the good level. Further, the outer surfaces of the hollow fiber membranes were observed with a microscope. As a result, any defect such as flaws or the like was not observed.

In a blood leak test using bovine blood, no leakage of blood cells was observed. The amount of the endotoxin filtered from the outside of the hollow fiber membrane to the inside thereof was smaller than the limit for detection, which was in the level of no problem. The results of other analyses are shown Table 1.

Comparative Example 4

Polyethersulfone (SUMIKAEXCEL®7800P, manufactured by Sumika Chem Tex Co., Ltd.) (23 mass %), PVP (COLIDONE®K-30 manufactured by BASF) (7 mass %), DMAc (67 mass %) and water (3 mass %) were dissolved at 50° C., and then, the system was vacuumed up to −500 mmHg with a vacuum pump. After that, the system was immediately sealed so as not to change the composition of the membrane-forming solution due to the evaporation of the solvent or the like, and the system in this state was left to stand alone for 30 minutes. This operation was repeated twice so as to degas the membrane-forming solution. This solution was allowed to pass through filters with pore sizes of 30 µm and 30 µm in two stages, and then was extruded from the outer slit of a tube-in-orifice nozzle heated to 50° C. Simultaneously with this extrusion, an aqueous solution of DMAc (50 mass %) of 50° C. as an interior-coagulating solution which had been previously degassed under reduced pressure was extruded. The resultant hollow fiber membrane was allowed to pass through an air gap with a length of 350 mm, which was blocked from an external air with a spinning tube, and then was coagulated in water of 50° C. The slit of the tube-in-orifice nozzle used had an average width of 45 μm, a maximum width of 45.5 μm and a minimum width of 44.5 μm, and the ratio of the maximum value to the minimum value of the width of the slit was 1.02. The draft ratio of the membrane-forming solution was 1.06. The absolute humidity of the drying zone was 0.07 kg/kg dry air. The hollow fiber membrane removed from the coagulating bath was allowed to pass through a water bath of 85° C. for 45 seconds to remove the solvent and the excessive hydrophilic polymer, and then was wound up. A bundle of 10,000 hollow fiber membranes as obtained above was directly dried at 60° C. for 18 hours, without washing. Sticking of the dried hollow fiber membranes was observed. It was impossible to make up a blood purifier of the hollow fiber membranes thus obtained, since an adhesive resin could not be successfully inserted between each of the hollow fiber membranes, when making up the blood purifier. The results of the analyses are shown Table 1.

Comparative Example 5

Polyethersulfone (SUMIKAEXCEL®4800P, manufactured by Sumika Chem Tex Co., Ltd.) (20 mass %), triethyleneglycol (manufactured by MISTUI CHEMICALS, INC.) (40 mass %), and N-methyl 2-pyrrolidone (manufactured by Mitsubishi Chemical Corporation) (40 mass %) were mixed and stirred to prepare a homogeneous and transparent membrane-forming solution. A hollow fiber membrane was obtained in the same manner as in Example 2, except that this membrane-forming solution and N-methyl 2-pyrrolidone/triethyleneglycol/water (=5/5/90) as a void-forming material were used. The inner diameter of the hollow fiber membrane was 195 μm; the thickness thereof was 51.5 μm; the moisture content thereof was 0.4 mass %; and the mass ratio of the hydrophilic polymer was 0 mass %.

This hollow fiber membrane had no problem in the amount of the eluted hydrophilic polymer and showed no sticking thereof and no backflow of endotoxin, but could not be used as a membrane for hemodialysis. The reasons therefor were that the hollow fiber membrane showed strong hydrophobic properties because of containing no hydrophilic polymer, and that the protein in blood clogged the pores of the membrane and was accumulated on the surface of the membrane.

Example 3

Polysulfone (P-3500 manufactured by AMOCO) (18.5 mass %), polyvinyl pyrrolidone (K-60 manufactured by BASF) (9 mass %), DMAc (67.5 mass %) and water (5 mass %) were dissolved at 50° C. Then, the inner space of the system was vacuumed up to −300 mmHg with a vacuum pump, and then was immediately sealed so as not to change the composition of the membrane-forming solution due to the evaporation of the solvent or the like and left to stand alone for 15 minutes. This operation was repeated three times to degas the membrane-forming solution. The resultant membrane-forming solution was allowed to pass through filters with pore sizes of 15 μm and 15 μm in two stages, and then was extruded through the outer slit of a tube-in-orifice nozzle heated to 40° C. Simultaneously with this extrusion, an aqueous solution of 35 mass % of DMAc of 0° C. as a void-forming agent which had been previously degassed under reduced pressure was extruded through the inner hole of the tube-in-orifice nozzle. The resultant hollow fiber membrane was allowed to pass through an air gap with a length of 600 mm which was shielded from an external air by a spinning tube, and then was coagulated in water of 50° C. The slit of the tube-in-orifice nozzle had an average width of 60 μm, a maximum width of 61 μm and a minimum width of 59 μm; the ratio of the maximum value to the minimum value of the width of the slit was 1.03; the draft ratio was 1.01; and the absolute humidity of the drying zone was 0.06 kg/kg dry air. The hollow fiber membrane removed from the coagulating bath was allowed to pass through a water bath of 85° C. for 45 seconds so as to remove the solvent and the excessive hydrophilic polymer, and then was wound up. A bundle of 10,500 hollow fiber membranes thus obtained was immersed in pure water, and then washed in an autoclave at 121° C. for one hour. After the washing, the bundle of hollow fiber membranes was wrapped in the same polyethylene film as that used in Example 1, and then was dried in the same manner as in Example 1. The rollers used for changing the fiber path in the spinning step were planished at their surfaces, and the stationary guides were matt-finished at their surfaces. The inner diameter of the resultant hollow fiber membrane was 201.3 μm, and the thickness thereof was 44.2 μm.

The hollow fiber membranes thus obtained were used to make up a blood purifier for use in a leak test. As a result, no failure in adhesion due to the sticking of the hollow fiber membranes was observed.

The resultant blood purifier was filled with RO water and irradiated with γ rays of an absorbed dose of 25 kGy to crosslink the hydrophilic polymer. The hollow fiber membranes were cut out of the blood purifier after the irradiation with γ rays, and were subjected to an elution test. As a result, the amount of the eluted PVP was 8 ppm, which was in the level of no problem. In addition, the outer surfaces of the hollow fiber membranes were observed with a microscope, and were found to have no defect such flaws or the like.

Fresh bovine blood admixed with citric acid was allowed to pass through the blood purifier at a flow rate of 200 mL/min. and at a filtering rate of 10 mL/min., with the result of no leakage of red blood cells. The amount of endotoxin filtered from the outer side to the inner side of the hollow fiber membrane was smaller than the limit for detection, which was in the level of no problem. The results of other analyses are shown in Table 1.

Example 4

Polysulfone (P-1700 manufactured by AMOCO) (17 mass %), polyvinyl pyrrolidone (K-60 manufactured by BASF) (4.8 mass %), DMAc (73.2 mass %) and water (5 mass %) were dissolved at 50° C. Then, the inner space of the system was vacuumed up to −400 mmHg with a vacuum pump, and then was immediately sealed so as not to change the composition of the membrane-forming solution due to the evaporation of the solvent or the like, and was left to stand alone for 30 minutes. This operation was repeated three times to degas the membrane-forming solution. The resultant membrane-forming solution was allowed to pass through two-stepped filters with pore sizes of 15 μm and 15 μm, and then was extruded through the outer slit of a tube-in-orifice nozzle heated to 40° C. Simultaneously with this extrusion, an aqueous solution of 35 mass % of DMAc of 0° C. as an interior-coagulating solution which had been previously degassed under reduced pressure was extruded through the inner hole of the tube-in-orifice nozzle. The resultant hollow fiber was allowed to pass through an air gap with a length of 600 mm which was shielded from an external air by a spinning tube, and then was coagulated in water of 50° C. The slit of the tube-in-orifice nozzle had an average width of 60 μm, a maximum width of 61 μm and a minimum width of 59 μm; the ratio of the maximum value to the minimum value of the width of the slit was 1.03; the draft ratio was 1.01; and the absolute humidity of the drying zone was 0.07 kg/kg dry air. The hollow fiber membrane removed from the coagulating bath was allowed to pass through a water bath of 85° C. for 45 seconds so as to remove the solvent and the excessive hydrophilic polymer, and then was wound up. A bundle of 10,700 hollow fiber membranes thus obtained was immersed in pure water, and then washed in an autoclave at 121° C. for one hour. After the washing, the bundle of hollow fiber membranes was wrapped in a polyethylene film, and then was dried in the same manner as in Example 2. The rollers used for changing the fiber path in the spinning step were planished at their surfaces, and the guides were matt-finished at their surfaces. The inner diameter of the resultant hollow fiber membrane was 201.2 μm, and the thickness thereof was 43.8 μm.

The bundle of the hollow fiber membranes thus obtained was used to make up a blood purifier for use in a leak test. As a result, no failure in adhesion due to the sticking of the hollow fiber membranes was observed. The resultant blood purifier was filled with RO water and irradiated with γ rays of an absorbed dose of 25 kGy to crosslink the hydrophilic polymer.

The hollow fiber membranes were cut out of the blood purifier after the irradiation with γ rays, and were subjected to an elution test. As a result, the amount of the eluted PVP was 4 ppm, which was in the level of no problem. In addition, the outer surfaces of the hollow fiber membranes were observed with a microscope, and were found to have no defect such flaws or the like.

Fresh bovine blood admixed with citric acid was allowed to pass through the blood purifier at a flow rate of 200 mL/min. and at a filtering rate of 10 mL/min., with the result of no leakage of red blood cells. The amount of endotoxin filtered from the outer side to the inner side of the hollow fiber membrane was smaller than the limit for detection, which was in the level of no problem. The results of other analyses are shown in Table 1.

INDUSTRIAL APPLICABILITY

The polysulfone type hollow fiber membranes of the present invention are reliable in safety and stability of performance and are easily incorporated into a module, and thus are suitable for use in hollow fiber type blood purifiers which are required to have highly water permeability to be used for therapy of chronic renal failure. Thus, the present invention will significantly contribute to the industry of this field.

TABLE 1

|  | Ex. 1 | Ex. 2 | Ex. 3 | Ex. 4 | Com. Ex. 1 | Com. Ex. 2 | Com. Ex. 3 | Com. Ex. 4 | Com. Ex. 5 |
|---|---|---|---|---|---|---|---|---|---|
| Coefficient of water permeability (ml/m$^2$/hr/mmHg) | 589 | 383 | 622 | 416 | 565 | 337 | 367 | — | 1210 |
| Burst pressure (MPa) | 0.6 | 0.7 | 1.1 | 0.9 | 0.6 | 0.6 | 0.6 | — | 0.7 |
| Non-uniformity in thickness (ratio) | 0.75 | 0.90 | 0.83 | 0.87 | 0.76 | 0.73 | 0.71 | — | 0.88 |
| Leakage of blood (number of modules) | 0 | 0 | 0 | 0 | 0 | 0 | 0 | — | 0 |
| Amount of eluted PVP (ppm) | 4 | 7 | 8 | 4 | 6 | 21 | 11 | 14 | — |
| Content of PVP in uppermost layer of inner surface of membrane [A] (mass %) | 25 | 22 | 35 | 30 | 18 | 45 | 39 | 28 | — |
| Content of PVP in proximate layer of inner surface of membrane [C] (mass %) | 11 | 12 | 17 | 18 | 4 | 26 | 21 | 9 | — |
| [A]/[C] | 2.27 | 1.83 | 2.06 | 1.67 | 4.5 | 1.73 | 1.86 | 3.11 | — |
| Content of PVP in uppermost layer of outer surface of membrane [B] (mass %) | 36 | 27 | 39 | 40 | 19 | 41 | 23 | 57 | — |
| [B]/[A] | 1.44 | 1.23 | 1.11 | 1.33 | 1.06 | 0.91 | 0.59 | 2.04 | — |
| PVP/PSf in membrane | 4.3 | 3.9 | 7.6 | 3.9 | 2.5 | 13.2 | 8.8 | 10.5 | — |
| Average pore area of outer surface of membrane (μm$^2$) | 0.6 | 0.5 | 0.8 | 0.6 | 0.4 | 0.3 | 0.4 | 0.2 | 0.1 |
| Rate of pore area of outer surface of membrane (%) | 18 | 19 | 13 | 22 | 20 | 11 | 12 | 5 | 9 |
| Moisture content (mass %) | 2.0 | 2.8 | 1.7 | 1.7 | 3.4 | 4.5 | 2.6 | 1.9 | 0.5 |
| PVP/PSf in dope | 0.27 | 0.28 | 0.49 | 0.28 | 0.27 | 0.68 | 0.68 | 0.30 | — |
| Number of membranes stuck | 0 | 0 | 0 | 0 | 0 | 17 | 0 | 30 | 0 |
| Permeation of endotoxin | ND | ND | ND | ND | ND | Some | ND | — | ND |
| Insoluble component | Some | None | Some | Some | Some | Some | Some | None | None |
| Blood left to remain in membrane | ○ | ○ | ○ | ○ | X | ○ | ○ | — | X |
| Priming capacity | ○ | ○ | ○ | ○ | ○ | ○ | X | — | X |

The invention claimed is:

1. A selectively permeable hollow fiber membrane comprising a polysulfone-based resin and a hydrophilic polymer as main components, wherein (A) the content of the hydrophilic polymer in the uppermost layer of an inner surface of the hollow fiber membrane is at least 1.1 times the content of the hydrophilic polymer in the proximate layer of said inner surface, and (B) the content of the hydrophilic polymer in the uppermost layer of an outer surface of the hollow fiber membrane is at least 1.1 times the content of the hydrophilic polymer in the uppermost layer of said inner surface.

2. The hollow fiber membrane of claim 1, wherein said uppermost layer of the inner surface of the hollow fiber membrane is a layer between the inner surface and a position present at a depth of 10 nm from the inner surface, and wherein said proximate layer is a layer between the inner surface and a position present at a depth of 1,000 to 1,500 nm (1 to 1.5 μm) from the inner surface.

3. The hollow fiber membrane of claim 1, wherein the content of the hydrophilic polymer in the hollow fiber membrane is 20 to 40 mass % at the uppermost layer of the inner surface of the membrane, 5 to 20 mass % at the proximate layer thereof, and 25 to 50 mass % at the uppermost layer of the outer surface of the membrane.

4. The hollow fiber membrane of claim 1, comprising 99 to 80 mass % of the polysulfone-based resin and 1 to 20 mass % of the hydrophilic polymer as the main components.

5. The hollow fiber membrane of claim 1, wherein the hydrophilic polymer is polyvinyl pyrrolidone.

6. The hollow fiber membrane of claim 1, wherein the amount of the hydrophilic polymer eluted from the hollow fiber membrane is 10 ppm or less.

7. The hollow fiber membrane of claim 1, wherein the rate of pore area of the outer surface of the hollow fiber membrane is 8% to less than 25%.

8. The hollow fiber membrane of claim 1, wherein the hydrophilic polymer is crosslinked so as to be insoluble in water.

9. A blood purifier comprising at least one hollow fiber membrane of claim 1.

* * * * *

UNITED STATES PATENT AND TRADEMARK OFFICE
CERTIFICATE OF CORRECTION

PATENT NO. : 7,638,052 B2  Page 1 of 1
APPLICATION NO. : 10/559544
DATED : December 29, 2009
INVENTOR(S) : Mabuchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 774 days.

Signed and Sealed this

Ninth Day of November, 2010

David J. Kappos
*Director of the United States Patent and Trademark Office*